United States Patent
Oh et al.

(10) Patent No.: US 10,211,461 B2
(45) Date of Patent: Feb. 19, 2019

(54) BINDER COMPOSITION FOR SECONDARY BATTERY ELECTRODE-USE, SLURRY COMPOSITION FOR SECONDARY BATTERY ELECTRODE-USE, ELECTRODE FOR SECONDARY BATTERY-USE, AND SECONDARY BATTERY

(71) Applicant: ZEON CORPORATION, Chiyoda-ku, Tokyo (JP)

(72) Inventors: Ken Oh, Tokyo (JP); Keiichiro Tanaka, Tokyo (JP); Mayumi Fukumine, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 187 days.

(21) Appl. No.: 15/126,587

(22) PCT Filed: Apr. 1, 2015

(86) PCT No.: PCT/JP2015/001883
§ 371 (c)(1),
(2) Date: Sep. 16, 2016

(87) PCT Pub. No.: WO2015/151525
PCT Pub. Date: Oct. 8, 2015

(65) Prior Publication Data
US 2017/0084923 A1    Mar. 23, 2017

(30) Foreign Application Priority Data

Apr. 2, 2014    (JP) .................. 2014-075941

(51) Int. Cl.
| | |
|---|---|
| *H01M 4/62* | (2006.01) |
| *H01M 4/36* | (2006.01) |
| *H01M 4/04* | (2006.01) |
| *C08F 18/22* | (2006.01) |
| *H01M 4/13* | (2010.01) |
| *H01M 10/0525* | (2010.01) |
| *H01M 4/139* | (2010.01) |

(52) U.S. Cl.
CPC ............ *H01M 4/623* (2013.01); *C08F 18/22* (2013.01); *H01M 4/0404* (2013.01); *H01M 4/364* (2013.01); *H01M 4/622* (2013.01); *H01M 4/13* (2013.01); *H01M 4/139* (2013.01); *H01M 10/0525* (2013.01)

(58) Field of Classification Search
CPC ...... H01M 4/623; H01M 4/622; H01M 4/364; H01M 4/0404; H01M 4/139; H01M 10/0525; H01M 4/13; C08F 18/22
See application file for complete search history.

(56) References Cited

U.S. PATENT DOCUMENTS

| | | | | |
|---|---|---|---|---|
| 2006/0003232 A1* | 1/2006 | Jung | ........................ | H01M 4/62 429/330 |
| 2012/0330589 A1* | 12/2012 | Ryu | ........................ | H01M 4/13 702/63 |
| 2013/0040210 A1* | 2/2013 | Mizuno | ................. | H01M 12/06 429/405 |
| 2013/0171521 A1 | 7/2013 | Sugimoto et al. | | |
| 2015/0125746 A1 | 5/2015 | Sonobe et al. | | |

FOREIGN PATENT DOCUMENTS

| | | |
|---|---|---|
| JP | 2006278303 A | 10/2006 |
| JP | 2012204303 A | 10/2012 |
| WO | 2012036260 A1 | 3/2012 |

OTHER PUBLICATIONS

JP2015-106489, English machine translations (Year: 2015).*
Oct. 4, 2016, International Preliminary Report on Patentability issued in the International Patent Application No. PCT/JP2015/001883.
Aug. 9, 2017, Extended European Search Report issued by the European Patent Office in the corresponding European Patent Application No. 15772818.9.

* cited by examiner

*Primary Examiner* — Lisa S Park
(74) *Attorney, Agent, or Firm* — Kenja IP Law PC

(57) ABSTRACT

Provided is a binder composition for secondary battery electrode-use that has high binding capacity, and that is capable of suppressing corrosion of a current collector and an increase in internal resistance when used in production of a secondary battery. The binder composition for secondary battery electrode-use contains a copolymer and a dispersion medium. The copolymer includes at least 5 mass % and no greater than 80 mass % of a constitutional unit represented by formula (I) and at least 5 mass % and no greater than 90 mass % of a constitutional unit represented by formula (II).

7 Claims, No Drawings

BINDER COMPOSITION FOR SECONDARY BATTERY ELECTRODE-USE, SLURRY COMPOSITION FOR SECONDARY BATTERY ELECTRODE-USE, ELECTRODE FOR SECONDARY BATTERY-USE, AND SECONDARY BATTERY

TECHNICAL FIELD

The present disclosure relates to a binder composition for secondary battery electrode-use, a slurry composition for secondary battery electrode-use, an electrode for secondary battery-use, and a secondary battery.

BACKGROUND

Secondary batteries such as lithium ion secondary batteries have characteristics such as compact size, light weight, high energy-density, and the ability to be repeatedly charged and discharged, and are used in a wide variety of applications. Consequently, in recent years, studies have been made to improve battery members such as electrodes for the purpose of achieving even higher secondary battery performance.

Battery members such as electrodes (positive electrodes and negative electrodes) for use in lithium ion secondary batteries may be formed by using a binder (binding material) in order to bind components contained in such a battery member to one another or in order to bind these components to a substrate (for example, a current collector). In one specific example, an electrode of a lithium ion secondary battery generally includes a current collector and an electrode mixed material layer formed on the current collector. The electrode mixed material layer is for example formed by applying, onto the current collector, a slurry composition in which an electrode active material, a binder composition, and, as necessary, a conductive material and so forth are dispersed in a dispersion medium, and by drying the applied slurry composition.

In recent years, there have been attempts to improve binder compositions and slurry compositions used in formation of battery members such as described above in order to further improve secondary battery performance.

In one specific example, PTL 1 reports that dispersibility of an electrode active material, and also rate characteristics and cycle characteristics of a lithium ion secondary battery, can be improved by producing an electrode for the lithium ion secondary battery using a binder composition that contains, as a binding material, a copolymer including a cationic group such as a quaternary ammonium salt group, a sulfonium salt group, or a phosphonium salt group. In PTL 1, various chlorides are used as cationic group-containing monomers that can be used in preparation of the aforementioned cationic group-containing copolymer.

CITATION LIST

Patent Literature

PTL 1: JP 2006-278303 A

SUMMARY

Technical Problem

However, the conventional binder composition described above suffers from a problem of not exhibiting sufficient binding capacity between an electrode mixed material layer and a current collector. Furthermore, an electrode for secondary battery-use and a secondary battery produced using the conventional binder composition described above suffer from a problem in terms that internal resistance of the electrode and the secondary battery is high, and output characteristics of the secondary battery are reduced, particularly at low temperatures. Moreover, since a chloride is used as a cationic group-containing monomer for preparation of the copolymer in the conventional binder composition described above, the copolymer includes a chloride ion as a counter ion for the cationic group. Therefore, in a situation in which a secondary battery electrode is produced using this binder composition, there is a concern that corrosion of a current collector and reduction in cycle characteristics of the secondary battery may occur due to the counter ion for the cationic group of the copolymer being a chloride ion.

An objective of the present disclosure is to provide a binder composition for secondary battery electrode-use that has high binding capacity, and that is capable of suppressing corrosion of a current collector and an increase in internal resistance when used in production of a secondary battery. Another objective of the present disclosure is to provide a slurry composition for secondary battery electrode-use that can be used to produce an electrode for secondary battery-use that has high peel strength and low internal resistance, and that enables a secondary battery to exhibit good cycle characteristics. Another objective of the present disclosure is to provide an electrode for secondary battery-use that has high peel strength and low internal resistance, and that enables a secondary battery to exhibit good cycle characteristics.

Another objective of the present disclosure is to provide a secondary battery that has excellent cycle characteristics and low internal resistance.

Solution to Problem

The inventors conducted diligent investigation aimed at solving the problems described above. The inventors discovered that a copolymer including specific percentages of specific constitutional units has excellent binding capacity, and is capable of suppressing corrosion of a current collector and an increase in internal resistance when used as a binding material in production of a secondary battery. This discovery led to the present disclosure.

Specifically, in order to advantageously solve the problems described above, a presently disclosed binder composition for secondary battery electrode-use comprises a copolymer and a dispersion medium, wherein the copolymer includes at least 5 mass % and no greater than 80 mass % of a constitutional unit represented by formula (I) shown below

[CHEM. 1]

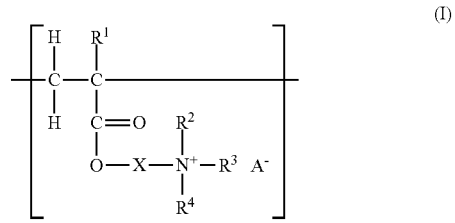

where, in formula (I), $R^1$ represents hydrogen or a monovalent organic group, $R^2$, $R^3$, and $R^4$ each represent, independently of one another, hydrogen or a monovalent organic group, X represents a hydrocarbon chain, and $A^-$ represents a monovalent anion selected from the group consisting of a bis(trifluoromethanesulfonyl)imide anion, a bis(fluorosulfonyl)imide anion, a perfluoroalkanesulfonate anion, and a monoalkyl sulfate anion, and the copolymer includes at least 5 mass % and no greater than 90 mass % of a constitutional unit represented by formula (II) shown below

[CHEM. 2]

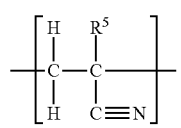

(II)

where, in formula (II), $R^5$ represents hydrogen, a methyl group, or a halogen atom. As a result of the copolymer used in the binder composition for secondary battery electrode-use containing specific amounts of the constitutional units represented by formula (I) and formula (II) shown above, the binding capacity of the binder composition for secondary battery electrode-use can be increased while also suppressing corrosion of a current collector and an increase in internal resistance when the binder composition for secondary battery electrode-use is used in production of a secondary battery.

In the presently disclosed binder composition for secondary battery electrode-use, the copolymer preferably further includes a constitutional unit represented by formula (III) shown below

[CHEM. 3]

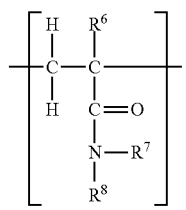

(III)

where, in formula (III), $R^6$ represents hydrogen or a substituted or unsubstituted alkyl group, and $R^7$ and $R^8$ each represent, independently of one another, hydrogen or a group selected from the group consisting of a substituted or unsubstituted alkyl group, a substituted or unsubstituted alkenyl group, a substituted or unsubstituted alkynyl group, and a substituted or unsubstituted aryl group. As a result of the copolymer further including the constitutional unit represented by formula (III) shown above, viscosity stability of a slurry composition for secondary battery electrode-use that is prepared using the binder composition for secondary battery electrode-use can be improved and a higher yield rate can be achieved in electrode production.

In the presently disclosed binder composition for secondary battery electrode-use, it is preferable that, in the constitutional unit represented by formula (I), $R^1$ is a methyl group, $R^2$, $R^3$, and $R^4$ are each a methyl group or an ethyl group, X is an ethylene group, and $A^-$ is a monovalent anion selected from the group consisting of a bis(trifluoromethanesulfonyl)imide anion, a trifluoromethanesulfonate anion, and a monomethyl sulfate anion. The copolymer in which $R^1$, $R^2$, $R^3$, $R^4$, X, and $A^-$ are as described above has a high degree of ion dissociation and, as a result, the binder composition for secondary battery electrode-use that contains this copolymer can be used to further reduce internal resistance of an electrode and a secondary battery.

Furthermore, in order to advantageously solve the problems described above, a presently disclosed slurry composition for secondary battery electrode-use comprises any one of the previously described binder compositions for secondary battery electrode-use and an electrode active material. The slurry composition for secondary battery electrode-use containing the previously described binder composition for secondary battery electrode-use can be used to produce an electrode for secondary battery-use that has high peel strength and low internal resistance, and that enables a secondary battery to exhibit good cycle characteristics.

The presently disclosed slurry composition for secondary battery electrode-use preferably further comprises a polymer other than the previously described copolymer. As a result of the slurry composition for secondary battery electrode-use containing the polymer other than the previously described copolymer, binding capacity between an electrode mixed material layer and a current collector, and output of an obtained secondary battery can be improved.

Furthermore, in the presently disclosed slurry composition for secondary battery electrode-use, the polymer other than the previously described copolymer is preferably a fluorine-containing polymer. As a result of the slurry composition for secondary battery electrode-use containing the fluorine-containing polymer, binding capacity between an electrode mixed material layer and a current collector, and output characteristics of an obtained secondary battery can be further improved.

In order to advantageously solve the problems described above, a presently disclosed electrode for secondary battery-use is obtainable by applying any one of the previously described slurry compositions for secondary battery electrode-use onto a current collector and drying the slurry composition for secondary battery electrode-use that has been applied onto the current collector. The electrode for secondary battery-use described above has high peel strength and low internal resistance, and can enable a secondary battery to exhibit good cycle characteristics.

In order to advantageously solve the problems described above, a presently disclosed secondary battery comprises a positive electrode, a negative electrode, an electrolysis solution, and a separator, wherein either or both of the positive electrode and the negative electrode are the previously described electrode for secondary battery-use. The secondary battery described above has low internal resistance and excellent cycle characteristics.

Advantageous Effect

According to the present disclosure, it is possible to provide a binder composition for secondary battery electrode-use that has high binding capacity, and that is capable of suppressing corrosion of a current collector and an increase in internal resistance when used in production of a secondary battery. Moreover, according to the present disclosure, it is possible to provide a slurry composition for secondary battery electrode-use that can be used to produce an electrode for secondary battery-use that has high peel strength and low internal resistance, and that enables a secondary battery to exhibit good cycle characteristics. Furthermore, according to the present disclosure, it is possible to provide an electrode for secondary battery-use that has high peel strength and low internal resistance, and that enables a secondary battery to exhibit good cycle characteristics.

Also, according to the present disclosure, it is possible to provide a secondary battery that has excellent cycle characteristics and low internal resistance.

DETAILED DESCRIPTION

The following describes embodiments of the present disclosure in detail.

Herein, a presently disclosed binder composition for secondary battery electrode-use is used to prepare a slurry composition for use in an electrode of a secondary battery such as a lithium ion secondary battery. Moreover, a presently disclosed slurry composition for secondary battery electrode-use is prepared using the presently disclosed binder composition for secondary battery electrode-use and an electrode active material, and is used to produce an electrode of a secondary battery. Furthermore, a presently disclosed electrode for secondary battery-use can be produced using the presently disclosed slurry composition for secondary battery electrode-use. Also, a feature of a presently disclosed secondary battery is that the presently disclosed electrode for secondary battery-use is used therein.

(Binder Composition for Secondary Battery Electrode-Use)

The presently disclosed binder composition for secondary battery electrode-use contains a copolymer and a dispersion medium. The copolymer includes at least 5 mass % and no greater than 80 mass % of a constitutional unit represented by formula (I) described further below and at least 5 mass % and no greater than 90 mass % of a constitutional unit represented by formula (II) described further below. The copolymer contained in the presently disclosed binder composition for secondary battery electrode-use has excellent binding capacity, and is capable of suppressing corrosion of a current collector and an increase in internal resistance when used as a binding material in production of an electrode and a secondary battery.

<Copolymer>

The copolymer contained in the presently disclosed binder composition for secondary battery electrode-use is a component that when the binder composition is used to produce an electrode, holds components contained in an electrode mixed material layer (for example, an electrode active material such as a positive electrode active material or a negative electrode active material) of the produced electrode so that the components do not become detached from the electrode.

The copolymer contained in the presently disclosed binder composition for secondary battery electrode-use is required to include specific percentages of a constitutional unit represented by formula (I) shown below (hereinafter, also referred to as "constitutional unit a") and a constitutional unit represented by formula (II) shown below (hereinafter, also referred to as "constitutional unit b"). The copolymer may optionally contain constitutional units other than the constitutional unit a and the constitutional unit b (hereinafter, also referred to as "other constitutional units").

Although it is not clear why the copolymer in the presently disclosed binder composition for secondary battery electrode-use has excellent binding capacity, and is capable of suppressing corrosion of a current collector and an increase in internal resistance when the binder composition is used in production of an electrode and a secondary battery, the reason for the above effects it presumed to be as follows.

Specifically, as a result of including the specific percentage of the constitutional unit b, the copolymer contained in the binder composition can be provided with a balance of both mechanical strength and flexibility, and can exhibit high binding capacity. Furthermore, since the constitutional unit a includes a specific monovalent anion $A^-$ that exhibits a high degree of ion dissociation, the copolymer that includes the specific percentage of the constitutional unit a can be used to suppress an increase in electrical resistance. Furthermore, as a result of $A^-$ (monovalent anion), which is a counter ion for an ammonium group ($-N^+R^2R^3R^4$) that is a cationic group of the constitutional unit a, being a specific anion, corrosion of a current collector can be suppressed, particularly even when used under high voltage conditions, compared to a conventional binder composition in which a chloride ion is present as a counter ion for a cationic group. Accordingly, through the binder composition containing this copolymer, it is possible to obtain high binding capacity, and also to suppress corrosion of a current collector and an increase in internal resistance when an electrode and a secondary battery are produced.

The following provides a detailed description of constitutional units included in the copolymer of the presently disclosed binder composition for secondary battery electrode-use.

[Constitutional Unit a]

The copolymer used in the presently disclosed binder composition for secondary battery electrode-use at least includes the constitutional unit a represented by formula (I) shown below.

[CHEM. 4]

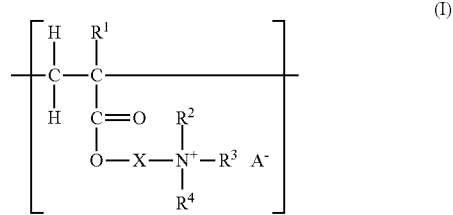

In formula (I), $R^1$ represents hydrogen or a monovalent organic group, $R^2$, $R^3$, and $R^4$ each represent, independently of one another, hydrogen or a monovalent organic group ($R^2$, $R^3$, and $R^4$ may be the same or different), X represents a hydrocarbon chain, and $A^-$ represents a monovalent anion selected from the group consisting of a bis(trifluoromethanesulfonyl)imide anion, a bis(fluorosulfonyl)imide anion, a perfluoroalkanesulfonate anion, and a monoalkyl sulfate anion.

It should be noted that the copolymer may include one kind of constitutional unit a individually, or may include two or more kinds of constitutional units a in a freely selected ratio.

$R^1$ in formula (I) is required to be hydrogen or a monovalent organic group, but from a viewpoint of ease of production of the copolymer (for example, cost and ease of acquisition of a raw material monomer and ease of polymerization), $R^1$ is preferably hydrogen or a substituted or unsubstituted alkyl group, more preferably an unsubstituted alkyl group having a carbon number of 1-4, and particularly preferably a methyl group.

$R^2$, $R^3$, and $R^4$ in formula (I) are each required to be, independently of one another, hydrogen or a monovalent organic group, but $R^2$, $R^3$, and $R^4$ are preferably each a monovalent organic group, and more preferably each a substituted or unsubstituted alkyl group, a substituted or unsubstituted alkenyl group, a substituted or unsubstituted alkynyl group, or a substituted or unsubstituted aryl group. A constitutional unit a in which $R^2$ to $R^4$ are each hydrogen has low stability and there is a concern that the desired effects may not be obtained due to conversion of the ammonium group ($-NH_3^+$) to an amine under alkaline conditions. Of the above examples, from a viewpoint of improving ease of production of the copolymer and reducing electrode internal resistance by improving the degree of ion dissociation of the monovalent anion $A^-$, it is preferable that $R^2$ to $R^4$ are each an unsubstituted alkyl group, more preferable that $R^2$ to $R^4$ are each an unsubstituted alkyl group having a carbon number of 1-4, further preferable that $R^2$ to $R^4$ are each a methyl group or an ethyl group, and particularly preferable that two of $R^2$ to $R^4$ are methyl groups and that the remaining one of $R^2$ to $R^4$ is a methyl group or an ethyl group.

X in formula (I) is preferably a hydrocarbon chain having a carbon number of 1-10, more preferably a hydrocarbon chain having a carbon number of 1-4, and particularly preferably an ethylene group. The reason for this is that when the carbon number of the hydrocarbon chain X is no greater than 10, the copolymer can be easily produced, the degree of ion dissociation of the monovalent anion $A^-$ can be improved, and electrode internal resistance can be reduced.

$A^-$ in formula (I) is required to be a monovalent anion selected from the group consisting of a bis(trifluoromethanesulfonyl)imide (TFSI) anion, a bis(fluorosulfonyl)imide (FSI) anion, a perfluoroalkanesulfonate anion, and a monoalkyl sulfate anion. Of these anions, from a viewpoint of improving the degree of ion dissociation of the monovalent anion $A^-$ and reducing electrode internal resistance, it is preferable that $A^-$ is a monovalent anion selected from the group consisting of a bis(trifluoromethanesulfonyl)imide anion, a bis(fluorosulfonyl)imide anion, a perfluoroalkanesulfonate anion having a carbon number of 1-10, and a monoalkyl sulfate anion having a carbon number of 1-10, and more preferable that $A^-$ is a monovalent anion selected from the group consisting of a bis(trifluoromethanesulfonyl)imide anion, a trifluoromethanesulfonate anion, and a monomethyl sulfate anion.

Furthermore, from a viewpoint of improving ease of production of the copolymer, and also of improving the degree of ion dissociation of the monovalent anion $A^-$ in order to reduce electrode internal resistance, it is particularly preferable that, in the constitutional unit a represented by formula (I) shown above, $R^1$ is a methyl group, $R^2$ to $R^4$ are each a methyl group or an ethyl group, X is an ethylene group, and $A^-$ is a monovalent anion selected from the group consisting of a bis(trifluoromethanesulfonyl)imide anion, a trifluoromethanesulfonate anion, and a monomethyl sulfate anion.

The following provides examples of monomers that can be used to form the constitutional unit a described above.

(1) Situation in which $A^-$ is a Perfluoroalkanesulfonate Anion or a Monoalkyl Sulfate Anion Although no specific limitations are placed on monomers that can be used to form the constitutional unit a in a situation in which $A^-$ is a perfluoroalkanesulfonate anion or a monoalkyl sulfate anion, examples of monomers that can be used include a monomer obtained through a reaction between a compound represented by formula (i) shown below

[CHEM. 5]

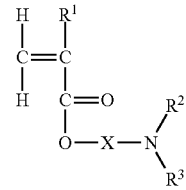

(i)

(in formula (i), $R^1$ represents hydrogen or a monovalent organic group, $R^2$ and $R^3$ each represent, independently of one another, hydrogen or a monovalent organic group [$R^2$ and $R^3$ may be the same or different], and X represents a hydrocarbon chain) and a compound selected from the group consisting of an ester of a perfluoroalkanesulfonic acid and an alkyl sulfate. Specific examples of the monomer described above include a monomer obtained through a reaction between a dialkylaminoalkyl (meth)acrylate, such as 2-dimethylaminoethyl methacrylate or 2-dimethylaminoethyl acrylate, and an alkyl sulfate, such as dimethyl sulfate, or an ester of a perfluoroalkanesulfonic acid, such as methyl trifluoromethanesulfonate.

Note that "(meth)acrylate" is used in the present description to indicate "acrylate" and/or "methacrylate".

(2) Situation in which $A^-$ is a Bis(Trifluoromethanesulfonyl)Imide Anion or a Bis(Fluorosulfonyl)Imide Anion Although no specific limitations are placed on monomers that can be used to form the constitutional unit a in a situation in which $A^-$ is a bis(trifluoromethanesulfonyl)imide anion or a bis(fluorosulfonyl)imide anion, examples of monomers that can be used include a monomer obtained through a reaction between a quaternized product of the compound represented by formula (i) shown above and a bis(trifluoromethanesulfonyl)imide salt or a bis(fluorosulfonyl)imide salt. Specific examples of the monomer described above include a monomer obtained through a reaction between 2-(methacryloyloxy)-N,N,N-trimethylethaneammonium chloride obtained through quaternization of 2-dimethylaminoethyl methacrylate and a lithium salt, sodium salt, or potassium salt of bis(trifluoromethanesulfonyl)imide or bis(fluorosulfonyl)imide.

Taking into account improvement of reaction efficiency, safety, and so forth, the quaternization reaction of the compound represented by formula (i) can be performed for from 30 minutes to 240 minutes at a temperature of from 0° C. to 80° C.

The content of the constitutional unit a in the copolymer used in the presently disclosed binder composition for secondary battery electrode-use is required to be at least 5 mass % and no greater than 80 mass %, is preferably at least 10 mass %, more preferably at least 15 mass %, further preferably at least 20 mass %, and particularly preferably at least 30 mass %, and is preferably no greater than 60 mass %, more preferably no greater than 50 mass %, and further preferably no greater than 40 mass %. One reason for this is that electrode internal resistance can be sufficiently reduced when the content of the constitutional unit a in the copolymer is at least 5 mass %. Another reason is that dispersibility of a slurry composition prepared using the binder composition can be increased when the content of the constitutional unit a is at least 5 mass %. Yet another reason is that a decrease in mechanical strength of the copolymer can be suppressed and binding capacity, particularly between an electrode mixed material layer and a current collector, can be improved when the content of the constitutional unit a in the copolymer is no greater than 80 mass %.

[Constitutional Unit b]

The copolymer used in the presently disclosed binder composition for secondary battery electrode-use at least includes the constitutional unit b represented by formula (II) shown below.

[CHEM. 6]

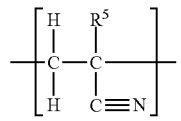
(II)

In formula (II), $R^5$ represents hydrogen, a methyl group, or a halogen atom.

It should be noted that the copolymer may include one kind of constitutional unit b individually, or may include two or more kinds of constitutional units b in a freely selected ratio.

Herein, $R^5$ in formula (II) is required to be hydrogen, a methyl group, or a halogen atom, but from a viewpoint of ease of production of the copolymer and, in particular, from a viewpoint of cost and ease of acquisition of a raw material monomer, it is preferable that $R^5$ is hydrogen.

Examples of monomers that can be used to form the constitutional unit b described above include α,β-unsaturated nitriles. Examples of α,β-unsaturated nitriles that can be used include acrylonitrile ($R^5$=hydrogen), methacrylonitrile ($R^5$=methyl group), and α-halogenoacrylonitriles ($R^5$=halogen atom) such as α-chloroacrylonitrile and α-bromoacrylonitrile.

The content of the constitutional unit b in the copolymer used in the presently disclosed binder composition for secondary battery electrode-use is required to be at least 5 mass % and no greater than 90 mass %, is preferably at least 10 mass %, and more preferably at least 20 mass %, and is preferably no greater than 80 mass %, more preferably no greater than 70 mass %, and particularly preferably no greater than 50 mass %. One reason for this is that mechanical strength of the copolymer can be ensured and binding capacity can be sufficiently improved when the content of the constitutional unit b in the copolymer is at least 5 mass %. Another reason is that flexibility of the copolymer can be prevented from decreasing excessively due to mechanical strength of the copolymer becoming excessively high and binding capacity can be ensured when the content of the constitutional unit b in the copolymer is no greater than 90 mass %. Yet another reason is that it is possible to prevent the percentage of the constitutional unit a becoming too small, and to achieve a reduction in electrode internal resistance and improvement in dispersibility of a slurry composition prepared using the binder composition.

[Other Constitutional Units]

The copolymer used in the presently disclosed binder composition for secondary battery electrode-use may include one or more constitutional units (other constitutional units) besides the constitutional unit a and the constitutional unit b described above. Although no specific limitations are placed on these other constitutional units, examples of other constitutional units include a constitutional unit (hereinafter, also referred to as "constitutional unit c") represented by formula (III) shown below

[CHEM. 7]

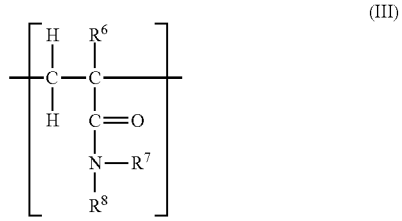
(III)

(in formula (III), $R^6$ represents hydrogen or a substituted or unsubstituted alkyl group, and $R^7$ and $R^8$ each represent, independently of one another, hydrogen or a group selected from the group consisting of a substituted or unsubstituted alkyl group, a substituted or unsubstituted alkenyl group, a substituted or unsubstituted alkynyl group, and a substituted or unsubstituted aryl group), and a constitutional unit (hereinafter, also referred to as "constitutional unit d") formed by a monomer that when used to form a homopolymer having a weight-average molecular weight of greater than 10,000, forms a homopolymer having a glass transition point Tg that is lower than room temperature.

The content of the aforementioned other constitutional units in the copolymer used in the presently disclosed binder composition for secondary battery electrode-use is preferably no greater than 70 mass %, more preferably no greater than 45 mass %, and further preferably no greater than 20 mass %. The reason for this is that it is possible to ensure that there are sufficient amounts of the constitutional unit a and the constitutional unit b in the copolymer when the content of the other constitutional units is no greater than 70 mass %.

[[Constitutional Unit c]]

In a situation in which the constitutional unit c described above is included in the copolymer used in the presently disclosed binder composition for secondary battery electrode-use, viscosity of a slurry composition for secondary battery electrode-use produced using the binder composition can be appropriately improved and the viscosity stability thereof can be improved such that a higher yield rate can be achieved in a secondary battery electrode production process.

It should be noted that the copolymer may include one kind of constitutional unit c individually, or may include two or more kinds of constitutional units c in a freely selected ratio.

From a viewpoint of ease of production of the copolymer, and in particular cost and ease of acquisition of a raw material monomer, $R^6$ in formula (III) is preferably hydrogen or a methyl group, and is more preferably hydrogen. For the same reason, $R^7$ and $R^8$ are preferably each hydrogen.

Examples of monomers that can be used to form the constitutional unit c include acrylamide and methacrylamide.

The content of the constitutional unit c in the copolymer used in the presently disclosed binder composition for secondary battery electrode-use is preferably no greater than 70 mass %, more preferably no greater than 50 mass %, further preferably no greater than 40 mass %, even more preferably no greater than 30 mass %, and particularly preferably no greater than 20 mass %. In terms of a lower limit, the content of the constitutional unit c is for example preferably at least 10 mass %. One reason for this is that it is possible to ensure that there are sufficient amounts of the constitutional unit a and the constitutional unit b in the copolymer when the content of the constitutional unit c is no greater than 70 mass %. Another reason is that viscosity stability of a slurry composition can be sufficiently increased when the content of the constitutional unit c is at least 10 mass %.

[[Constitutional Unit d]]

In a situation in which the constitutional unit d described above is included in the copolymer used in the presently disclosed binder composition for secondary battery electrode-use, it is possible to improve flexibility of the copolymer and ensure high binding capacity.

It should be noted that the copolymer may include one kind of constitutional unit d individually, or may include two or more kinds of constitutional units d in a freely selected ratio.

No specific limitations are placed on monomers that can be used to form the constitutional unit d other than being a monomer that when used to form a homopolymer having a weight-average molecular weight of greater than 10,000, forms a homopolymer having a glass transition point Tg that is lower than room temperature, preferably lower than 0° C., and more preferably lower than −20° C. Examples of monomers that can be used include esters of (meth)acrylic acid. The ester of (meth)acrylic acid may for example be an alkyl (meth)acrylate such as methyl acrylate, ethyl acrylate, or butyl (meth)acrylate.

Note that in the present description, "(meth)acryl" in "ester of (meth)acrylic acid" and the like is used to indicate "acryl" and/or "methacryl".

The content of the constitutional unit d in the copolymer used in the presently disclosed binder composition for secondary battery electrode-use is preferably no greater than 70 mass %, more preferably no greater than 50 mass %, further preferably no greater than 40 mass %, even more preferably no greater than 30 mass %, and particularly preferably no greater than 20 mass %. The reason for this is that it is possible to ensure that there are sufficient amounts of the constitutional unit a and the constitutional unit b in the copolymer when the content of the constitutional unit d is no greater than 70 mass %.

[Copolymer Preparation]

The copolymer described above can be produced, without any specific limitations, through polymerization of a monomer composition containing monomers that can form the constitutional units described above, for example in an aqueous solvent. Note that the percentage content of each monomer in the monomer composition can be set in accordance with the percentage of the corresponding monomer constitutional unit (repeating unit) in the copolymer.

No specific limitations are placed on the method by which the previously described copolymer is produced, and the method may for example be solution polymerization, suspension polymerization, bulk polymerization, or emulsion polymerization.

Moreover, the polymerization method may be addition polymerization such as ionic polymerization, radical polymerization, or living radical polymerization. Furthermore, a known polymerization initiator may be used.

<Dispersion Medium>

The presently disclosed binder composition for secondary battery electrode-use contains a dispersion medium. The dispersion medium may be an aqueous solvent that is used in production of the copolymer, or may be an organic solvent. Specifically, in a situation in which an aqueous dispersion of the copolymer formed by polymerization of the monomer composition in an aqueous solvent is used as-produced as the binder composition, the dispersion medium may be an aqueous solvent used in the polymerization, such as water or an aqueous solution. Moreover, in a situation in which, for example, the monomer composition is polymerized in an aqueous solvent and the aqueous solvent is subsequently substituted with an organic solvent to obtain the binder composition, the dispersion medium may be the organic solvent. Examples of organic solvents that can be used, without any specific limitations, include N-methylpyrrolidone (NMP), acetonitrile, acetylpyridine, cyclopentanone, dimethylformamide, dimethyl sulfoxide, methylformamide, methyl ethyl ketone, furfural, and ethylenediamine. The dispersion medium is preferably an organic solvent and is more preferably N-methylpyrrolidone (NMP).

Furthermore, the presently disclosed binder composition for secondary battery electrode-use may contain one kind of solvent individually as the dispersion medium, or may contain two or more kinds of solvents in a freely selected ratio as the dispersion medium.

<Other Components>

In addition to the components described above, the presently disclosed binder composition for secondary battery electrode-use may contain known optional components that can be contained in a binder composition. Furthermore, the presently disclosed binder composition for secondary battery electrode-use may contain a residue, such as a residue of a polymerization initiator used in polymerization of the copolymer.

(Slurry Composition for Secondary Battery Electrode-Use)

The presently disclosed slurry composition for secondary battery electrode-use contains the previously described binder composition for secondary battery electrode-use and an electrode active material. In the presently disclosed slurry composition for secondary battery electrode-use, the copolymer contained in the binder composition for secondary battery electrode-use serves as at least part of a binding material. Through use of the slurry composition for secondary battery electrode-use described above, it is possible to provide an electrode for secondary battery-use in which binding capacity between an electrode mixed material layer and a current collector is high and internal resistance is low, and also to provide a secondary battery having excellent cycle characteristics in which this electrode for secondary battery-use is used.

In addition to the aforementioned binder composition for secondary battery electrode-use and electrode active material, the presently disclosed slurry composition for secondary battery electrode-use may optionally contain, for example, a conductive material, a polymer other than the copolymer contained in the binder composition, and other optional additives.

<Electrode Active Material>

The electrode active material is a material that accepts and donates electrons in an electrode (positive/negative electrode) of a secondary battery. The following describes the electrode active material (positive/negative electrode active material) in the slurry composition for secondary battery electrode-use using one example in which the slurry composition is a slurry composition for lithium ion secondary battery electrode-use that is used in production of an electrode of a lithium ion secondary battery.

[Positive Electrode Active Material]

A positive electrode active material contained in the slurry composition for lithium ion secondary battery positive electrode-use may, without any specific limitations, be a known positive electrode active material that is used in electrodes of lithium ion secondary batteries. Specific examples of the positive electrode active material include transition metal-containing compounds, such as a transition metal oxide, a transition metal sulfide, and a composite metal oxide comprising lithium and a transition metal. Examples of the transition metal include Ti, V, Cr, Mn, Fe, Co, Ni, Cu, and Mo.

Examples of the transition metal oxide include MnO, $MnO_2$, $V_2O_5$, $V_6O_{13}$, $TiO_2$, $Cu_2V_2O_3$, amorphous $V_2O$—$P_2O_5$, amorphous $MoO_3$, amorphous $V_2O_5$, and amorphous $V_6O_{13}$.

Examples of the transition metal sulfide include $TiS_2$, $TiS_3$, amorphous $MoS_2$, and FeS.

Examples of the composite metal oxide comprising lithium and a transition metal include a lithium-containing composite metal oxide with a layered structure, a lithium-containing composite metal oxide with a spinel structure, and a lithium-containing composite metal oxide with an olivine structure.

Examples of the lithium-containing composite metal oxide with a layered structure include lithium-containing cobalt oxide ($LiCoO_2$), lithium-containing nickel oxide ($LiNiO_2$), lithium-containing composite oxide of Co—Ni—Mn, lithium-containing composite oxide of Ni—Mn—Al, lithium-containing composite oxide of Ni—Co—Al, and a solid solution comprising $LiMaO_2$ and $Li_2MbO_3$. Examples of the solid solution comprising $LiMaO_2$ and $Li_2MbO_3$ include $xLiMaO_2 \cdot (1-x)Li_2MbO_3$ and the like, where x represents a number satisfying $0<x<1$, Ma represents one or more kinds of transition metals with an average oxidation state of 3+, and Mb represents one or more kinds of transition metals with an average oxidation state of 4+.

The term "average oxidation state" as used herein refers to an average oxidation state of the "one or more kinds of transition metals" and is calculated from the molar quantity and the valence of the transition metal. For example, in a situation in which the "one or more kinds of transition metals" is made up of 50 mol % of $Ni^{2+}$ and 50 mol % of $Mn^{4+}$, the average oxidation state of the "one or more kinds of transition metals" is $(0.5) \times (2+) + (0.5) \times (4+) = 3+$.

Examples of the lithium-containing composite metal oxide with a spinel structure include lithium manganate ($LiMn_2O_4$) and compounds obtained by substituting part of Mn contained in lithium manganate ($LiMn_2O_4$) with another transition metal. One specific example thereof is $Li_s[Mn_{2-t}Mc_t]O_4$, where Mc represents one or more kinds of transition metals having an average oxidation state of 4+, which may be Ni, Co, Fe, Cu, or Cr; t represents a number satisfying $0<t<1$; and s represents a number satisfying $0 \leq s \leq 1$. Another example of the positive electrode active material is lithium-rich spinel compounds represented by $Li_{1+x}Mn_{2-x}O_4$ ($0<x<2$).

Examples of the lithium-containing composite metal oxide with an olivine structure include olivine-type lithium phosphate compounds represented by the formula $Li_yMdPO_4$ such as olivine-type lithium iron phosphate ($LiFePO_4$) and olivine-type manganese lithium phosphate ($LiMnPO_4$), where Md represents one or more kinds of transition metals having an average oxidation state of 3+, which may be Mn, Fe, or Co, and y represents a number satisfying $0 \leq y \leq 2$. Md of the olivine-type lithium phosphate compounds represented by the formula $Li_yMdPO_4$ may be partly substituted with another metal. Examples of the metal possibly substituting the part of Md include Cu, Mg, Zn, V, Ca, Sr, Ba, Ti, Al, Si, B, and Mo.

Of the above-described positive electrode active materials, lithium-containing cobalt oxide ($LiCoO_2$) or olivine-type lithium iron phosphate ($LiFePO_4$) is preferred to improve the cycle characteristics and initial capacity of the secondary battery that includes the positive electrode formed with the slurry composition.

On the other hand, to increase the capacity of the lithium ion secondary battery that includes the positive electrode formed with the slurry composition, a positive electrode active material containing at least one of Mn and Ni is preferred. Specifically, to increase the capacity of the lithium ion secondary battery, the positive electrode active material may preferably be $LiNiO_2$, $LiMn_2O_4$, lithium-rich spinel compounds, $LiMnPO_4$, $Li[Ni_{0.5}Co_{0.2}Mn_{0.3}]O_2$, $Li[Ni_{1/3}Co_{1/3}Mn_{1/3}]O_2$, $Li[Ni_{0.17}Li_{0.2}Co_{0.07}Mn_{0.56}]O_2$, $LiNi_{0.5}Mn_{1.5}O_4$, or the like; more preferably be $LiNiO_2$, lithium-rich spinel compounds, $Li[Ni_{0.5}Co_{0.2}Mn_{0.3}]O_2$, $Li[Ni_{1/3}Co_{1/3}Mn_{1/3}]O_2$, $Li[Ni_{0.17}Li_{0.2}Co_{0.07}Mn_{0.56}]O_2$, or the like; and particularly preferably be $Li[Ni_{0.5}Co_{0.2}Mn_{0.3}]O_2$.

The particle diameter and the specific surface area of the positive electrode active material may be, but are not limited to, the same as those of conventionally-used positive electrode active materials.

In a situation in which the presently disclosed slurry composition for secondary battery electrode-use is used to produce a positive electrode, the content of the positive electrode active material in the slurry composition is not specifically limited, but may for example preferably be at least 90 parts by mass and no greater than 98 parts by mass per 100 parts by mass of solid content of the slurry composition. Internal resistance of the positive electrode for secondary battery-use can be kept at an appropriate level while improving secondary battery capacity as a result of the content of the positive electrode active material being in the aforementioned range.

[Negative Electrode Active Material]

A negative electrode active material contained in the slurry composition for lithium ion secondary battery negative electrode-use may, without any specific limitations, be a known negative electrode active material that is used in electrodes of lithium ion secondary batteries. Specifically, the negative electrode active material is normally a material that can occlude and release lithium. Examples of the material that can occlude and release lithium include a carbon-based negative electrode active material, a metal-based negative electrode active material, and a negative electrode active material formed by combining these materials.

[[Carbon-Based Negative Electrode Active Material]]

The carbon-based negative electrode active material can be defined as an active material that contains carbon as its main backbone and into which lithium can be inserted (also referred to as "doping"). Examples of the carbon-based negative electrode active material include carbonaceous materials and graphitic materials.

Examples of the carbonaceous material include graphitizing carbon whose carbon structure can easily be changed according to the heat treatment temperature, and non-graphitizing carbon typified by glassy carbon, which has a structure similar to an amorphous structure.

The graphitizing carbon may be a carbon material made using tar pitch obtained from petroleum or coal as a raw material. Specific examples of graphitizing carbon include coke, mesocarbon microbeads (MCMB), mesophase pitch-based carbon fiber, and pyrolytic vapor-grown carbon fiber.

Examples of the non-graphitizing carbon include sintered phenolic resin, polyacrylonitrile-based carbon fiber, quasi-isotropic carbon, sintered furfuryl alcohol resin (PFA), and hard carbon.

Examples of the graphitic material include graphite such as natural graphite and artificial graphite.

[[Metal-Based Negative Electrode Active Material]]

The metal-based negative electrode active material is an active material that contains metal, the structure of which usually contains an element that allows insertion of lithium, and that exhibits, when lithium is inserted, a theoretical electrical capacity of 500 mAh/g or higher per unit mass. Examples of the metal-based active material include a lithium metal; a simple substance of metal that can form a lithium alloy (e.g., Ag, Al, Ba, Bi, Cu, Ga, Ge, In, Ni, P, Pb, Sb, Si, Sn, Sr, Zn, and Ti); alloys of the simple substance of metal; and oxides, sulfides, nitrides, silicides, carbides, and phosphides of the lithium metal, the simple substance of metal, and the alloys of the simple substance of metal.

Of the metal-based negative electrode active materials, active materials containing silicon (silicon-based negative electrode active materials) are preferred. With the use of the silicon-based negative electrode active material, the capacity of a lithium ion secondary battery can be increased.

Examples of the silicon-based negative electrode active material include silicon (Si), a silicon-containing alloy, SiO, $SiO_x$, and a composite material of conductive carbon and a Si-containing material obtained by coating or combining a Si-containing material with conductive carbon. The silicon-based negative electrode active material may be one kind of material used individually, or may be two or more kinds of materials used in combination.

The silicon-containing alloy may be for example an alloy composition that contains silicon, aluminum, and transition metals such as iron, and further rare-earth elements such as tin and yttrium.

$SiO_x$ is a compound that contains Si and at least one of SiO and $SiO_2$, where x is usually 0.01 or greater but less than 2. $SiO_x$ can be formed for example by utilizing the disproportionation reaction of silicon monoxide (SiO). Specifically, SiO can be prepared by heat-treating SiO optionally in the presence of a polymer such as polyvinyl alcohol to form silicon and silicon dioxide. The heat treatment can be performed, after pulverizing and mixing SiO optionally with a polymer, at a temperature of 900° C. or higher, and preferably 1000° C. or higher, in an atmosphere containing organic gas and/or vapor.

The composite of a Si-containing material and conductive carbon may be, for example, a compound obtained, for example, by heat-treating a pulverized mixture of SiO, a polymer such as polyvinyl alcohol, and optionally a carbon material in an atmosphere containing organic gas and/or vapor. Furthermore, a commonly known method can be used, such as a method of coating the surface of particles of SiO with organic gas or the like by chemical vapor deposition, or a method of forming composite particles (granulation) using particles of SiO and graphite or artificial graphite by a mechanochemical process.

The particle diameter and the specific surface area of the negative electrode active material may be, but are not limited to, the same as those of conventionally-used negative electrode active materials.

In a situation in which the presently disclosed slurry composition for secondary battery electrode-use is used to produce a negative electrode, the content of the negative electrode active material in the slurry composition is not specifically limited, but may for example preferably be at least 90 parts by mass and no greater than 98 parts by mass per 100 parts by mass of solid content of the slurry composition. Internal resistance of a negative electrode for secondary battery-use can be kept at an appropriate level while improving secondary battery capacity as a result of the content of the negative electrode active material being in the aforementioned range.

<Binder Composition>

The copolymer contained in the above-described binder composition serves as at least part of a binding material in an electrode mixed material layer of an electrode for secondary battery-use produced using the slurry composition for secondary battery electrode-use.

In the presently disclosed slurry composition for secondary battery electrode-use, the solid content equivalent amount of the previously described binder composition for secondary battery electrode-use per 100 parts by mass of the electrode active material is, for example, preferably at least 0.1 parts by mass and no greater than 10 parts by mass, and more preferably at least 0.5 parts by mass and no greater than 5 parts by mass. As a result of the content of the copolymer being in the range described above, secondary battery output characteristics can be improved while also obtaining other desired effects such a reduction in internal resistance of an electrode for secondary battery-use.

<Conductive Material>

The conductive material ensures electrical contact within the electrode active material. The conductive material may be, but is not specifically limited to, known conductive materials. Specific examples of conductive materials for use in a positive electrode of a lithium ion secondary battery include conductive carbon materials such as acetylene black, Ketjenblack® (Ketjenblack is a registered trademark in Japan, other countries, or both), carbon black, and graphite; and fibers and foils of various metals. Of these materials, acetylene black, Ketjenblack®, carbon black, and graphite are preferable and acetylene black and Ketjenblack® are particularly preferable as the conductive material from a viewpoint of improving the electrical contact within the positive electrode active material and improving the electrical characteristics of a lithium ion secondary battery including a positive electrode formed using the slurry composition.

In a situation in which the presently disclosed slurry composition for secondary battery electrode-use is used to produce a positive electrode, although no specific limitations are placed on the blending amount of the conductive material in the slurry composition, the amount per 100 parts by mass of the positive electrode active material is, for example, preferably at least 1 part by mass and no greater than 5 parts by mass. If the blending amount of the conductive material is excessively small, electrical contact within the positive electrode active material cannot be sufficiently ensured, which consequently fails to provide the lithium ion secondary battery with adequate electrical characteristics. Conversely, if the blending amount of the conductive material is excessively large, the stability of the slurry composition and the density of the positive electrode mixed material layer in the positive electrode are reduced, which consequently fails to sufficiently increase the capacity of the lithium ion secondary battery.

<Other Polymers>

In addition to the copolymer contained in the previously described binder composition, the presently disclosed slurry composition for secondary battery electrode-use may contain one or more polymers (hereinafter, also referred to as "other polymers") beside the copolymer as the binding material. The reason for this is that binding capacity between an electrode mixed material layer and a current collector can be further improved and output characteristics of an obtained secondary battery can be improved as a result of the slurry composition for secondary battery electrode-use containing other polymers such as described above.

Examples of other polymers that can be used include a fluorine-containing polymer and an acrylonitrile polymer. The fluorine-containing polymer may be a polymer including at least 30 mass % of a vinylidene fluoride unit and is for example polyvinylidene fluoride. The acrylonitrile polymer may be a polymer including greater than 90 mass % of an acrylonitrile unit and is for example polyacrylonitrile. Of these other polymers, the fluorine-containing polymer is preferable from a viewpoint of further improving binding capacity between an electrode mixed material layer and a current collector, and also further improving secondary battery output characteristics.

In a situation in which the presently disclosed slurry composition for secondary battery electrode-use contains other polymers besides the copolymer contained in the binder composition, although no specific limitations are placed on the content of the other polymers, the amount of the other polymers among the total of the solid content equivalent amount of the binder composition and the amount of the other polymers is preferably at least 10 mass % and no greater than 90 mass %, and more preferably at least 20 mass % and no greater than 80 mass %. Binding capacity between an electrode mixed material layer and a current collector can be improved while also improving secondary battery output characteristics as a result of the content of the other polymers besides the copolymer being in the aforementioned range.

<Other Additives>

Besides the components described above, the presently disclosed slurry composition for secondary battery electrode-use may further contain other components such as a reinforcing agent, an antioxidant, a viscosity modifier such as a thickener, a surfactant, a dispersant, and an additive for an electrolysis solution having a function of suppressing decomposition of the electrolysis solution. These other additives may be commonly known additives such as those described, for example, in WO 2012/036260 A1 and JP 2012-204303 A.

<Preparation of Slurry Composition for Secondary Battery Electrode-Use>

The presently disclosed slurry composition for secondary battery electrode-use can be prepared by mixing or dispersing the components described above in an organic solvent. Specifically, the slurry composition can be prepared by mixing the above-described components and the organic solvent using a mixer such as a ball mill, a sand mill, a bead mill, a pigment disperser, a grinding machine, an ultrasonic disperser, a homogenizer, a planetary mixer, or a FILMIX.

Note that an organic solvent contained in the binder composition may be used as the aforementioned organic solvent, or an organic solvent may be added in preparation of the slurry composition as the aforementioned organic solvent. Mixing of the above-described components with the organic solvent may normally be performed for a period of from 10 minutes to a several hours in a temperature range of from room temperature to 80° C.

(Electrode for Secondary Battery-Use)

The presently disclosed electrode for secondary battery-use is obtainable by applying the slurry composition for secondary battery electrode-use that is produced as described above onto a current collector and drying the applied slurry composition for secondary battery electrode-use that has been applied onto the current collector. In other words, the electrode for secondary battery-use is obtainable through a slurry composition application step and a slurry composition drying step.

Furthermore, the presently disclosed electrode for secondary battery-use includes a current collector and an electrode mixed material layer that is formed on the current collector and that at least contains an electrode active material and the previously described copolymer. It should be noted that components such as the electrode active material that are contained in the electrode mixed material layer are components that are contained in the presently disclosed slurry composition for secondary battery electrode-use. Furthermore, the preferred ratio of these components in the electrode mixed material layer is the same as the preferred ratio of these components in the presently disclosed slurry composition for secondary battery electrode-use. As a result of the presently disclosed binder composition being used in the presently disclosed electrode for secondary battery-use, the electrode has high peel strength and low internal resistance, and can enable a secondary battery to exhibit good cycle characteristics.

[Application Step]

The previously described slurry composition for secondary battery electrode-use can be applied onto the current collector by any commonly known method without any specific limitations. Specific examples of application methods that can be used include doctor blading, dip coating, reverse roll coating, direct roll coating, gravure coating, extrusion coating, and brush coating. The slurry composition may be applied onto one side or both sides of the current collector. The thickness of the slurry coating on the current collector after application but before drying may be set as appropriate in accordance with the thickness of the electrode mixed material layer to be obtained after drying.

The current collector onto which the slurry composition is applied is not specifically limited other than being a material having electrical conductivity and electrochemical durability. From a viewpoint of heat resistance, the material of the current collector is preferably a metal and is, for example, preferably iron, copper, aluminum, nickel, stainless steel, titanium, tantalum, gold, or platinum. Of these metals, aluminum is particularly preferable for use in a positive electrode and copper is preferable for use in a negative electrode. The material of the current collector may be one kind of material that is used individually, or two or more kinds of materials that are combined in a freely selected ratio.

[Drying Step]

The slurry composition that has been applied onto the current collector may be dried by any commonly known method without any specific limitations. Examples of drying methods that can be used include drying by warm, hot, or low-humidity air; drying in a vacuum; and drying by irradiation with infrared light or electron beams. Through drying of the slurry composition on the current collector as described above, an electrode active material layer is formed on the current collector, thereby providing an electrode for secondary battery-use that includes the current collector and the electrode mixed material layer.

After the drying step, the electrode mixed material layer may be further subjected to pressing treatment, such as mold pressing or roll pressing. The pressing treatment increases the close adherence between the electrode mixed material layer and the current collector, and reduces porosity of the electrode.

Another example of a method that can be used to produce the presently disclosed electrode for secondary battery-use is a powder shaping method. The powder shaping method is a production method in which the electrode for secondary battery-use is obtained by preparing a slurry composition for producing the electrode for secondary battery-use, preparing composite particles containing an electrode active material and the like from the slurry composition, supplying the composite particles onto a current collector, and further performing shaping by roll pressing as desired to form an electrode mixed material layer. In the above method, the slurry composition may be the same as the previously described slurry composition.

(Secondary Battery)

The presently disclosed secondary battery includes a positive electrode, a negative electrode, an electrolysis solution, and a separator. Moreover, either or both of the positive electrode and the negative electrode are the presently disclosed electrode for secondary battery-use. The presently disclosed secondary battery has excellent cycle characteristics and low internal resistance as a result of the aforementioned electrodes being used therein.

The presently disclosed secondary battery may for example be a lithium ion secondary battery or a nickel-hydrogen secondary battery. Of these secondary batteries, a lithium ion secondary battery is preferable in terms that the effect of improving performance, such as cycle characteristics, is particularly remarkable in the case of a lithium ion secondary battery. The following explains, as one example, a situation in which the presently disclosed secondary battery is a lithium ion secondary battery.

<Electrodes>

As explained above, the presently disclosed electrode for secondary battery-use is used as either or both of the positive electrode and the negative electrode. In other words, the positive electrode of the presently disclosed secondary battery may be the presently disclosed electrode for secondary battery-use and the negative electrode of the presently disclosed secondary battery may be a known negative electrode other than the presently disclosed electrode for secondary battery-use. Alternatively, the negative electrode of the presently disclosed secondary battery may be the presently disclosed electrode for secondary battery-use and the positive electrode of the presently disclosed secondary battery may be a known positive electrode other than the presently disclosed electrode for secondary battery-use. Further alternatively, the positive electrode and the negative electrode of the presently disclosed secondary battery may both be the presently disclosed electrode for secondary battery-use.

<Electrolysis Solution>

One example of an electrolysis solution for a lithium ion secondary battery is a non-aqueous electrolysis solution obtained by dissolving a supporting electrolyte in a non-aqueous solvent. The supporting electrolyte is normally a lithium salt. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable since these lithium salts readily dissolved in a solvent and exhibit a high degree of dissociation. The lithium salt may be one kind of lithium salt used individually, or may be two or more kinds of lithium salts combined in a freely selected ratio. Lithium ion conductivity tends to increase when a supporting electrolyte with a higher degree of dissociation is used. Therefore, lithium ion conductivity can be adjusted through the type of supporting electrolyte.

No specific limitations are placed on the non-aqueous solvent so long as the supporting electrolyte can dissolve therein. Examples of non-aqueous solvents that can be used include carbonates such as dimethyl carbonate (DMC), ethylene carbonate (EC), diethyl carbonate (DEC), propylene carbonate (PC), butylene carbonate (BC), and methyl ethyl carbonate (MEC); esters such as γ-butyrolactone and methyl formate; ethers such as 1,2-dimethoxyethane and tetrahydrofuran, and sulfur-containing compounds such as sulfolane and dimethyl sulfoxide. Of these non-aqueous solvents, carbonates are preferable in terms of having high permittivity and a wide stable potential region. The non-aqueous solvent may be one kind of solvent used individually, or may be two or more kinds of solvents combined in a freely selected ratio.

Furthermore, the electrolysis solution may contain additives. Examples of additives that can be used include carbonate-based compounds such as vinylene carbonate (VC). One kind of additive may be used individually, or two or more kinds of additives may be combined in a freely selected ratio. Examples of electrolysis solutions that may be used other than those described above include a polymer electrolyte such as polyethylene oxide or polyacrylonitrile; a gel-form polymer electrolyte containing the aforementioned polymer electrolyte in an electrolysis solution; and an inorganic solid electrolyte such as LiI or $Li_3N$.

<Separator>

Examples of the separator include separators described in JP 2012-204303 A. Of these separators, a fine porous membrane formed from a polyolefinic resin (polyethylene, polypropylene, polybutene, or polyvinyl chloride) is preferable in terms that the entire separator can be formed with a thin film-thickness and that the ratio of the electrode active material in the lithium ion secondary battery can be increased so as to increase the capacity per unit volume of the lithium ion secondary battery.

<Method for Producing Secondary Battery>

In one specific example of a method for producing the presently disclosed secondary battery, the positive electrode and the negative electrode are stacked with the separator in-between, the resultant stack is rolled or folded as necessary in accordance with the battery shape and is placed in a battery container, and the battery container is filled with the electrolysis solution and is sealed. In order to prevent pressure increase inside the battery and occurrence of overcharging or overdischarging, an expanded metal; an overcurrent preventing device such as a PTC device or a fuse; or a lead plate may be placed in the battery container as necessary. The shape of the secondary battery may be a coin type, button type, sheet type, cylinder type, prismatic type, flat type, or the like.

EXAMPLES

The following provides a more specific explanation of the present disclosure through examples. However, the present disclosure is not limited to the following examples. In the following, "%" and "parts" used in expressing quantities are by mass, unless otherwise specified.

In each of Examples 1-15 described below, a secondary battery prepared as one embodiment of the present disclosure included the presently disclosed electrode for secondary battery-use as a positive electrode and a known negative electrode other than the presently disclosed electrode for secondary battery-use as a negative electrode. Furthermore, in Example 16 described below, a secondary battery prepared as one embodiment of the presently disclosure included the presently disclosed electrode for secondary battery-use as both a positive electrode and a negative electrode.

In the examples and comparative examples, evaluation was performed by the following methods in order to evaluate viscosity stability of a slurry composition for secondary battery electrode-use, peel strength of a positive electrode for secondary battery-use, peel strength of a negative electrode for secondary battery-use, and low-temperature characteristics, high-temperature storage characteristics, and high-temperature cycle characteristics of a secondary battery.

<Viscosity Stability of Slurry Composition for Secondary Battery Electrode-Use>

A single-cylinder rotational viscometer (25° C., rotation speed=60 rpm, spindle shape: 4) was used to measure viscosity, in accordance with JIS Z8803:1991, with respect to a slurry composition straight after preparation and also after storage for 24 hours at a temperature of 25° C. Thereafter, a "viscosity temporal change index" was calculated from (slurry composition viscosity after storage for 24 hours)/(slurry composition viscosity straight after preparation) and was evaluated based on the following criteria. A viscosity temporal change index of closer to 1 indicates that the slurry composition has better dispersibility and viscosity stability.

A: Viscosity temporal change index of at least 0.8 and no greater than 1.2

B: Viscosity temporal change index of at least 0.7 and less than 0.8, or of greater than 1.2 and no greater than 1.3

C: Viscosity temporal change index of at least 0.6 and less than 0.7, or of greater than 1.3 and no greater than 1.4

D: Viscosity temporal change index of less than 0.6, or of greater than 1.4

<Peel Strength of Positive Electrode for Secondary Battery-Use>

A prepared positive electrode was cut to a rectangular shape of 1.0 cm in width by 10 cm in length and was used as a test piece. A piece of adhesive cellophane tape was then attached to the surface of the test piece on the positive electrode mixed material layer side. The adhesive cellophane tape used was the tape prescribed by JIS Z1522. The test piece was then peeled off from the cellophane tape, which was secured to a test bed, from one end of the test piece toward its other end at a rate of 50 mm/minute while measuring the stress caused by the peeling. This measurement was performed 10 times to obtain an average value of the stress. The average value was taken to be the peel strength (N/m) and was evaluated based on the following criteria. A greater peel strength indicates better close adherence of the positive electrode mixed material layer to the current collector.

A: Peel strength of at least 30 N/m
B: Peel strength of at least 20 N/m and less than 30 N/m
C: Peel strength of at least 10 N/m and less than 20 N/m
D: Peel strength of less than 10 N/m <Peel Strength of Negative Electrode for Secondary Battery-Use>

A prepared negative electrode was cut to a rectangular shape of 1.0 cm in width by 10 cm in length and was used as a test piece. A piece of adhesive cellophane tape was then attached to the surface of the test piece on the negative electrode mixed material layer side. The adhesive cellophane tape used was the tape prescribed by JIS Z1522. The test piece was then peeled off from the cellophane tape, which was secured to a test bed, from one end of the test piece toward its other end at a rate of 50 mm/minute while measuring the stress caused by the peeling. This measurement was performed 10 times to obtain an average value of the stress. The average value was taken to be the peel strength (N/m) and was evaluated based on the following criteria. A greater peel strength indicates better close adherence of the negative electrode mixed material layer to the current collector.

A: Peel strength of at least 20 N/m
B: Peel strength of at least 15 N/m and less than 20 N/m
C: Peel strength of at least 10 N/m and less than 15 N/m
D: Peel strength of less than 10 N/m <Low-Temperature Characteristics of Secondary Battery>

In order to evaluate low-temperature characteristics of a prepared secondary battery, IV resistance was measured as described below. The secondary battery was charged to a 50% SOC (State of Charge) at 1 C (C is a value represented by rated capacity (mA)/1 hour (h)) at an ambient temperature of −10° C. Thereafter, 15 seconds of charging and 15 seconds of discharging were performed at 0.5 C, 1.0 C, 1.5 C, and 2.0 C, centering on the 50% SOC. For each of these cases (charging side and discharging side), the battery voltage after 15 seconds was plotted against the current value, and the gradient was calculated as the IV resistance ($\Omega$) (charging IV resistance and discharging IV resistance). The obtained IV resistance value ($\Omega$) was evaluated based on the following criteria. A smaller IV resistance value indicates smaller internal resistance and better low-temperature characteristics.

A: IV resistance of no greater than 10$\Omega$
B: IV resistance of greater than 10$\Omega$ and no greater than 15$\Omega$
C: IV resistance of greater than 15$\Omega$ and no greater than 20$\Omega$
D: IV resistance of greater than 20$\Omega$ <High-Temperature Storage Characteristics of Secondary Battery>

A prepared secondary battery was charged to 4.3 V by the constant-current method at 0.1 C and an ambient temperature of 25° C., and was thereafter stored for 100 hours at 80° C. The open circuit voltage (hereinafter, abbreviated as "OCV") before storage at 80° C. and the cell OCV after storage for 100 hours at 80° C. were measured. OCV retention was calculated by calculating the OCV after storage for 100 hours at 80° C. as a percentage relative to the OCV before storage at 80° C., and was evaluated based on the following criteria. Greater OCV retention indicates better high-temperature storage characteristics, and thus better life characteristics.

A: OCV retention of at least 99.0%
B: OCV retention of at least 98.5% and less than 99.0%
C: OCV retention of at least 98.0% and less than 98.5%
D: OCV retention of less than 98.0%

<High-Temperature Cycle Characteristics of Secondary Battery>

A prepared secondary battery was subjected to 100 cycles of a repeated operation in which, at an ambient temperature of 45° C., the secondary battery was charged to 4.2 V and discharged to 3.0 V by the constant-current method at 1.0 C. Charge/discharge capacity retention (%) represented by the ratio of electrical capacity after completion of 100 cycles and electrical capacity after completion of 5 cycles ((electrical capacity after completion of 100 cycles/electrical capacity after completion of 5 cycles)×100) was calculated, and the calculated charge/discharge capacity retention (%) was evaluated based on the following criteria. Greater charge/discharge capacity retention indicates better high-temperature cycle characteristics.

A: Charge/discharge capacity retention of at least 95%
B: Charge/discharge capacity retention of at least 90% and less than 95%
C: Charge/discharge capacity retention of at least 85% and less than 90%
D: Charge/discharge capacity retention of less than 85%

Example 1

<Synthesis of Copolymer and Preparation of Binder Composition for Secondary Battery Positive Electrode-Use>

A reaction tank equipped with a stirrer was charged with 16.65 parts of 2-dimethylaminoethyl methacrylate as the compound represented by formula (i) described above and 50 parts of acrylonitrile as a solvent. The contents of the reaction tank were heated to 40° C. and 13.35 parts of dimethyl sulfate was dripped therein as an alkyl sulfate. Next, stirring was performed for 1 hour at from 40° C. to 50° C. to obtain a solution containing 2-(methacryloyloxy)-N,N,N-trimethylethaneammonium monomethyl sulfate salt (CM-1) as a monomer capable of forming the constitutional unit a and acrylonitrile as a monomer capable of forming the constitutional unit b. Note that although the acrylonitrile is a monomer capable of forming the constitutional unit b, at this stage (i.e., before addition of a polymerization initiator), the acrylonitrile serves as a solvent.

Thereafter, the resultant solution was heated to 70° C. and 300 parts of deionized water, 20 parts of acrylamide as a monomer capable of forming the constitutional unit c, and 0.5 parts of potassium persulfate as a polymerization initiator were added to the solution. Purging with nitrogen was carried out and polymerization was performed while maintaining the temperature at 70° C. for 3 hours and at 85° C. for 3 hours to yield a homogeneous aqueous dispersion containing a copolymer (copolymer including the constitutional unit a represented by formula (I) [where $R^1$, $R^2$, $R^3$, and $R^4$ are methyl groups, X is an ethylene group, and $A^-$ is a monomethyl sulfate anion], the constitutional unit b represented by formula (II) [where $R^5$ is hydrogen], and the constitutional unit c represented by formula (III) [where $R^6$, $R^7$, and $R^8$ are each hydrogen]). The polymerization conversion rate was calculated to be 99% from the solid content concentration.

N-methylpyrrolidone (NMP) was added in an amount of 350 parts relative to 100 parts (solid content: 24.75 parts) of the aqueous dispersion. Thereafter, 40.62 parts of NMP was evaporated in accompaniment to water under reduced pressure to yield a binder composition for secondary battery positive electrode-use (solid content concentration: 8%).

The content of each constitutional unit in the copolymer contained in the resultant binder composition was as shown in Table 1.

<Preparation of Slurry Composition for Secondary Battery Positive Electrode-Use>

A slurry composition for secondary battery positive electrode-use was prepared by blending 100 parts of $LiCoO_2$ (produced by Nippon Chemical Industrial Co., Ltd., product name: CELLSEED C-10N) as a positive electrode active material, 2.1 parts of acetylene black as a conductive material, and 1.0 parts by solid content equivalents of the binder composition prepared as described above, adding further N-methylpyrrolidone until the viscosity was from 4,000 mPa·s to 5,000 mPa·s, and performing mixing using a planetary mixer. The viscosity stability of the resultant slurry composition was evaluated. The results are shown in Table 1.

<Preparation of Positive Electrode for Secondary Battery-Use>

The slurry composition for secondary battery positive electrode-use obtained as described above was applied onto aluminum foil (current collector) of 20 μm in thickness with an application amount of from 30.5 mg/cm² to 31.5 mg/cm² using a comma coater. Next, the aluminum foil with the slurry composition for secondary battery positive electrode-use applied thereon was conveyed within a 60° C. oven for 2 minutes at a speed of 0.5 m/minute in order to dry the slurry composition. Thereafter, heat treatment was performed for 2 minutes at a temperature of 120° C. to obtain a positive electrode web.

The obtained positive electrode web was pressed using a roll press such as to have a density of from 3.40 g/cm³ to 3.50 g/cm³ after pressing. Thereafter, the pressed positive electrode web was left for 3 hours under vacuum conditions at an ambient temperature of 120° C. in order to remove moisture and, as a result, a positive electrode for secondary battery-use was obtained. The peel strength of the obtained positive electrode was evaluated. The results are shown in Table 1.

<Preparation of Slurry Composition for Secondary Battery Negative Electrode-Use>

A slurry composition for negative electrode-use was prepared by mixing 100 parts of graphite having a volume average particle diameter of 20 μm and a specific surface area of 4.2 m²/g as a negative electrode active material, 1.0 parts (solid content equivalents) of a 40 mass % styrene-butadiene copolymer aqueous dispersion (produced by Zeon Corporation, negative electrode binder BM-400B) as a binding material, and 1.0 parts (solid content equivalents) of carboxymethyl cellulose sodium salt as a thickener, further adding water, and performing mixing using a planetary mixer.

<Preparation of Negative Electrode for Secondary Battery-Use>

The slurry composition for secondary battery negative electrode-use obtained as described above was applied onto copper foil (current collector) of 20 μm in thickness with an application amount of from 9.2 mg/cm² to 9.8 mg/cm² using a comma coater. Next, the copper foil with the slurry composition for secondary battery negative electrode-use applied thereon was conveyed within a 60° C. oven for 2 minutes and a 110° C. oven for 2 minutes at a speed of 0.2 m/minute in order to dry the slurry composition on the copper foil and obtain a negative electrode web.

The obtained negative electrode web was pressed using a roll press such as to have a density of from 1.63 g/cm³ to 1.67 g/cm³ after pressing. Thereafter, the pressed negative electrode web was left for 10 hours under vacuum conditions at an ambient temperature of 120° C. in order to remove moisture and, as a result, a negative electrode for secondary battery-use was obtained.

<Preparation of Laminate Cell Secondary Battery>

A battery container was prepared using a laminate film formed by an aluminum sheet and polypropylene resin coating both sides of the aluminum sheet. Next, the electrode mixed material layer was removed from the ends of the positive electrode and the negative electrode described above such as to form a location at which the copper foil or the aluminum foil was exposed. A Ni tab was welded to the location at which the aluminum foil of the positive electrode was exposed and a Cu tab was welded to the location at which the copper foil of the negative electrode was exposed. The resultant positive electrode and negative electrode each having an attached tab were stacked with a separator formed by a fine porous membrane made from polyethylene sandwiched in-between the positive and negative electrodes. The surfaces of the electrodes were arranged such that the surface at the positive electrode mixed material layer-side of the positive electrode and the surface at the negative electrode mixed material layer-side of the negative electrode faced one another. The stacked electrodes and separator were wound and placed in the previously described battery container. Thereafter, the battery container was filled with an electrolysis solution. The electrolysis solution was prepared by mixing ethylene carbonate and diethyl carbonate in a volume ratio of 1:2 at 25° C. to obtain a mixed solvent and dissolving $LiPF_6$ in the mixed solvent such as to have a concentration of 1 mol/L.

Next, the laminate film was sealed to prepare a laminate cell secondary battery, which is a secondary battery in accordance with the present disclosure. Low-temperature characteristics, high-temperature storage characteristics, and high-temperature cycle characteristics of the obtained laminate cell secondary battery were evaluated. The results are shown in Table 1.

Examples 2 and 3

A binder composition for positive electrode-use, a slurry composition for positive electrode-use, a positive electrode, a negative electrode, and a secondary battery were prepared and evaluated in the same way as in Example 1 with the exception that the content of the constitutional unit a and the content of the constitutional unit b in the copolymer were adjusted as shown in Table 1 by changing the blending amounts of 2-dimethylaminoethyl methacrylate, acrylonitrile, and dimethyl sulfate in preparation of CM-1. The results are shown in Table 1.

Example 4

A binder composition for positive electrode-use, a slurry composition for positive electrode-use, a positive electrode, a negative electrode, and a secondary battery were prepared and evaluated in the same way as in Example 1 with the exception that the content of the constitutional unit a and the content of the constitutional unit b in the copolymer were adjusted as shown in Table 1 by changing the blending amounts of 2-dimethylaminoethyl methacrylate, acrylonitrile, and dimethyl sulfate in preparation of CM-1, and additionally blending butyl acrylate (Tg of −54° C. or lower for a homopolymer having a weight-average molecular weight of greater than 10,000) during preparation of the copolymer as a monomer capable of forming the constitutional unit d such that the content of the constitutional unit d was as shown in Table 1. The results are shown in Table 1.

Example 5

A binder composition for positive electrode-use, a slurry composition for positive electrode-use, a positive electrode, a negative electrode, and a secondary battery were prepared and evaluated in the same way as in Example 1 with the exception that a copolymer and a binder composition prepared as described below were used. The results are shown in Table 1.

<Synthesis of Copolymer and Preparation of Binder Composition for Secondary Battery Positive Electrode-Use>

A reaction tank equipped with a stirrer was charged with 13.25 parts of 2-(methacryloyloxy)-N,N,N-trimethylethaneammonium chloride (quaternized product of dimethylaminoethyl methacrylate) as a compound obtained through quaternization of the compound represented by formula (i) shown above, 100 parts of deionized water, and 19.65 parts of lithium bis(trifluoromethanesulfonyl)imide (lithium salt of TFSI). The contents of the reaction tank were stirred for 12 hours at room temperature (25° C.). Extraction was performed using diethyl ether (two extractions and two water washes). Thereafter, the diethyl ether solvent was evaporated to obtain 2-(methacryloyloxy)-N,N,N-trimethylethaneammonium trifluoromethanesulfonyl imide salt (CM-2) as a monomer capable of forming the constitutional unit a.

Thereafter, 50 parts of acrylonitrile was added as a monomer capable of forming the constitutional unit b, heating was performed to 70° C., and then 300 parts of deionized water, 20 parts of acrylamide as a monomer capable of forming the constitutional unit c, and 0.5 parts of potassium persulfate as a polymerization initiator were further added. Purging with nitrogen was carried out and polymerization was performed while maintaining the temperature at 70° C. for 3 hours and at 85° C. for 3 hours to yield a homogeneous aqueous dispersion containing a copolymer (copolymer including the constitutional unit a represented by formula (I) [where $R^1$, $R^2$, $R^3$, and $R^4$ are methyl groups, X is an ethylene group, and $A^-$ is a bis(trifluoromethanesulfonyl)imide anion], the constitutional unit b represented by formula (II) [where $R^5$ is hydrogen], and the constitutional unit c represented by formula (III) [where $R^6$, $R^7$, and $R^8$ are each hydrogen]). The polymerization conversion rate was calculated to be 99% from the solid content concentration.

N-methylpyrrolidone (NMP) was added in an amount of 350 parts relative to 100 parts (solid content: 24.75 parts) of the aqueous dispersion. Thereafter, 40.62 parts of NMP was evaporated in accompaniment to water under reduced pressure to yield a binder composition for secondary battery positive electrode-use (solid content concentration: 8%).

The content of each constitutional unit in the copolymer contained in the resultant binder composition was as shown in Table 1.

Examples 6 and 7

A binder composition for positive electrode-use, a slurry composition for positive electrode-use, a positive electrode, a negative electrode, and a secondary battery were prepared and evaluated in the same way as in Example 5 with the exception that the content of the constitutional unit a and the content of the constitutional unit b in the copolymer were adjusted as shown in Table 1 by changing the blending amounts of 2-(methacryloyloxy)-N,N,N-trimethylethaneammonium chloride and lithium bis(trifluoromethanesulfonyl)imide in preparation of CM-2 and the blending amount of acrylonitrile in preparation of the copolymer. The results are shown in Table 1.

Example 8

A binder composition for positive electrode-use, a slurry composition for positive electrode-use, a positive electrode, a negative electrode, and a secondary battery were prepared and evaluated in the same way as in Example 5 with the exception that the content of the constitutional unit a and the content of the constitutional unit b in the copolymer were adjusted as shown in Table 1 by changing the blending amounts of 2-(methacryloyloxy)-N,N,N-trimethylethaneammonium chloride and lithium bis(trifluoromethanesulfonyl)imide in preparation of CM-2 and the blending amount of acrylonitrile in preparation of the copolymer, and additionally blending butyl acrylate in preparation of the copolymer as a monomer capable of forming the constitutional unit d such that the content of the constitutional unit d was as shown in Table 1. The results are shown in Table 1.

Example 9

A binder composition for positive electrode-use, a slurry composition for positive electrode-use, a positive electrode, a negative electrode, and a secondary battery were prepared and evaluated in the same way as in Example 1 with the exception that that a copolymer and a binder composition prepared as described below were used. The results are shown in Table 1.
<Synthesis of Copolymer and Preparation of Binder Composition for Secondary Battery Positive Electrode-Use>
A reaction tank equipped with a stirrer was charged with 14.68 parts of 2-dimethylaminoethyl methacrylate as the compound represented by formula (i) described above. After 15.32 parts of methyl trifluoromethanesulfonate had been dripped in at room temperature (25° C.) as an ester of a perfluoroalkanesulfonic acid, heating was performed to 40° C. Thereafter, stirring was performed for 1 hour to obtain 2-(methacryloyloxy)-N,N,N-trimethylethaneammonium trifluoromethanesulfonate salt (CM-3) as a monomer capable of forming the constitutional unit a.

Thereafter, 50 parts of acrylonitrile was added as a monomer capable of forming the constitutional unit b, heating was performed to 70° C., and then 300 parts of deionized water, 20 parts of acrylamide as a monomer capable of forming the constitutional unit c, and 0.5 parts of potassium persulfate as a polymerization initiator were further added. Purging with nitrogen was carried out and polymerization was performed while maintaining the temperature at 70° C. for 3 hours and at 85° C. for 3 hours to yield a homogeneous aqueous dispersion containing a copolymer (copolymer including the constitutional unit a represented by formula (I) [where $R^1$, $R^2$, $R^3$, and $R^4$ are methyl groups, X is an ethylene group, and $A^-$ is a trifluoromethanesulfonate anion], the constitutional unit b represented by formula (II) [where $R^5$ is hydrogen], and the constitutional unit c represented by formula (III) [where $R^6$, $R^7$, and $R^8$ are each hydrogen]). The polymerization conversion rate was calculated to be 99% from the solid content concentration.

N-methylpyrrolidone (NMP) was added in an amount of 350 parts relative to 100 parts (solid content: 24.75 parts) of the aqueous dispersion. Thereafter, 40.62 parts of NMP was evaporated in accompaniment to water under reduced pressure to yield a binder composition for secondary battery positive electrode-use (solid content concentration: 8%).

The content of each constitutional unit in the copolymer contained in the resultant binder composition was as shown in Table 1.

Examples 10 and 11

A binder composition for positive electrode-use, a slurry composition for positive electrode-use, a positive electrode, a negative electrode, and a secondary battery were prepared and evaluated in the same way as in Example 9 with the exception that the content of the constitutional unit a and the content of the constitutional unit b in the copolymer were adjusted as shown in Table 1 by changing the blending amounts of 2-dimethylaminoethyl methacrylate and methyl trifluoromethanesulfonate in preparation of CM-3 and the blending amount of acrylonitrile in preparation of the copolymer. The results are shown in Table 1.

Example 12

A binder composition for positive electrode-use, a slurry composition for positive electrode-use, a positive electrode, a negative electrode, and a secondary battery were prepared and evaluated in the same way as in Example 9 with the exception that the content of the constitutional unit a and the content of the constitutional unit b in the copolymer were adjusted as shown in Table 1 by changing the blending amounts of 2-dimethylaminoethyl methacrylate and methyl trifluoromethanesulfonate in preparation of CM-3 and the blending amount of acrylonitrile in preparation of the copolymer, and additionally blending butyl acrylate in preparation of the copolymer as a monomer capable of forming the constitutional unit d such that the content of the constitutional unit d was as shown in Table 1. The results are shown in Table 1.

Example 13

A binder composition for positive electrode-use, a slurry composition for positive electrode-use, a positive electrode, a negative electrode, and a secondary battery were prepared and evaluated in the same way as in Example 1 with the exception that the blending amount of the binder composition was 0.5 parts by solid content equivalents and that 0.5 parts by solid content equivalents of polyvinylidene fluoride (PVDF) (produced by Kureha Corporation, product name: KF#7208) was further blended as another polymer. The results are shown in Table 1.

Example 14

A binder composition for positive electrode-use, a slurry composition for positive electrode-use, a positive electrode, a negative electrode, and a secondary battery were prepared and evaluated in the same way as in Example 1 with the exception that the content of the constitutional unit a and the content of the constitutional unit b in the copolymer were adjusted as shown in Table 1 by changing the blending amount of acrylonitrile in preparation of CM-1 and not blending acrylamide in preparation of the copolymer. The results are shown in Table 1.

Example 15

A binder composition for positive electrode-use, a slurry composition for positive electrode-use, a positive electrode, a negative electrode, and a secondary battery were prepared and evaluated in the same way as in Example 1 with the exception that that a copolymer and a binder composition prepared as described below were used. The results are shown in Table 1.
<Synthesis of Copolymer and Preparation of Binder Composition for Secondary Battery Positive Electrode-Use>
A reaction tank equipped with a stirrer was charged with 15.15 parts of 2-dimethylaminoethyl methacrylate as the compound represented by formula (i) described above and 50 parts of acrylonitrile as a solvent. Heating was performed to 40° C. and 14.85 parts of diethyl sulfate was dripped in as an alkyl sulfate. Next, stirring was performed for 1 hour at from 40° C. to 50° C. to obtain a solution containing 2-(methacryloyloxy)-N,N,N-dimethylethaneammonium monoethyl sulfate salt (CM-4) as a monomer capable of forming the constitutional unit a and acrylonitrile as a monomer capable of forming the constitutional unit b.

Thereafter, the resultant solution was heated to 70° C. and 300 parts of deionized water, 20 parts of acrylamide as a monomer capable of forming the constitutional unit c, and 0.5 parts of potassium persulfate as a polymerization initiator were added to the solution. Purging with nitrogen was carried out and polymerization was performed while maintaining the temperature at 70° C. for 3 hours and at 85° C. for 3 hours to yield a homogeneous aqueous dispersion containing a copolymer (copolymer including the constitutional unit a represented by formula (I) [where $R^1$, $R^2$, and $R^3$ are methyl groups, $R^4$ is an ethyl group, X is an ethylene group, and $A^-$ is a monoethyl sulfate anion], the constitutional unit b represented by formula (II) [where $R^5$ is hydrogen], and the constitutional unit c represented by formula (III) [where $R^6$, $R^7$, and $R^8$ are each hydrogen]). The polymerization conversion rate was calculated to be 99% from the solid content concentration.

N-methylpyrrolidone (NMP) was added in an amount of 350 parts relative to 100 parts (solid content: 24.75 parts) of the aqueous dispersion. Thereafter, 40.62 parts of NMP was evaporated in accompaniment to water under reduced pressure to yield a binder composition for secondary battery positive electrode-use (solid content concentration: 8%).

The content of each constitutional unit in the copolymer contained in the resultant binder composition was as shown in Table 1.

Example 16

A binder composition for positive electrode-use, a slurry composition for positive electrode-use, a slurry composition for negative electrode-use, a negative electrode, and a secondary battery were prepared and evaluated (in Example 16, viscosity stability of the slurry composition for negative electrode-use and peel strength of the negative electrode were also evaluated) in the same way as in Example 1 with the exception that the 40 mass % styrene-butadiene copolymer aqueous dispersion used as the binding material in the slurry composition for secondary battery negative electrode-use was replaced with a binder composition for secondary battery negative electrode-use that was prepared in the same way as the binder composition for secondary battery positive electrode-use in Example 1. The results are shown in Table 1.

Comparative Example 1

A binder composition for positive electrode-use, a slurry composition for positive electrode-use, a positive electrode, a negative electrode, and a secondary battery were prepared and evaluated in the same way as in Example 1 with the exception that a copolymer and a binder composition prepared as described below were used. The results are shown in Table 1.
<Synthesis of Copolymer and Preparation of Binder Composition for Secondary Battery Positive Electrode-Use>

A reaction tank equipped with a stirrer was charged with 300 parts of deionized water, 80 parts of acrylonitrile as a monomer capable of forming the constitutional unit b, and 20 parts of acrylamide as a monomer capable of forming the constitutional unit c, and 0.5 parts of potassium persulfate was added thereto as a polymerization initiator. Purging with nitrogen was carried out and polymerization was performed while maintaining the temperature at 70° C. for 3 hours and at 85° C. for 3 hours to yield an inhomogeneous aqueous dispersion of coarse particles containing a copolymer (copolymer including the constitutional unit b represented by formula (II) [where $R^5$ is hydrogen] and the constitutional unit c represented by formula (III) [where $R^6$, $R^7$, and $R^8$ are each hydrogen], but not including the constitutional unit a). The polymerization conversion rate was calculated to be 82% from the solid content concentration.

Next, 1 part of aluminum sulfate was added to the aqueous dispersion. The aqueous dispersion was filtered and the filtered-off solid content was washed twice with water to obtain a solid polymer. N-methylpyrrolidone (NMP) was added in an amount of 350 parts relative to 24.75 parts of the solid polymer. Thereafter, 40.62 parts of NMP was evaporated in accompaniment to water under reduced pressure to yield a binder composition for secondary battery positive electrode-use (solid content concentration: 8%).

Comparative Examples 2 and 3

A binder composition for positive electrode-use, a slurry composition for positive electrode-use, a positive electrode, a negative electrode, and a secondary battery were prepared and evaluated in the same way as in Example 1 with the exception that the contents of the constitutional units a, b, c, and d in the copolymer were adjusted as shown in Table 1 by appropriately changing the blending amounts of 2-dimethylaminoethyl methacrylate, acrylonitrile, and dimethyl sulfate in preparation of CM-1 and/or the blending amounts of acrylamide and butyl acrylate in preparation of the copolymer. The results are shown in Table 1.

Comparative Example 4

A binder composition for positive electrode-use, a slurry composition for positive electrode-use, a positive electrode, a negative electrode, and a secondary battery were prepared and evaluated in the same way as in Example 1 with the exception that a copolymer and a binder composition prepared as described below were used. The results are shown in Table 1.
<Synthesis of Copolymer and Preparation of Binder Composition for Secondary Battery Positive Electrode-Use>

A reaction tank equipped with a stirrer was charged with 30 parts of 2-(methacryloyloxy)-N,N,N-trimethylethaneammonium chloride (quaternized product of dimethylaminoethyl methacrylate; CM-5), 300 parts of deionized water, 50 parts of acrylonitrile, and 20 parts of acrylamide, and 0.5 parts of potassium persulfate was added thereto as a polymerization initiator. Purging with nitrogen was carried out and polymerization was performed while maintaining the temperature at 70° C. for 3 hours and at 85° C. for 3 hours to yield a homogeneous aqueous dispersion containing a copolymer (copolymer including the constitutional unit a represented by formula (I) [where $R^1$, $R^2$, $R^3$, and $R^4$ are methyl groups, X is an ethylene group, and $A^-$ is a chloride ion], the constitutional unit b represented by formula (II) [where $R^5$ is hydrogen], and the constitutional unit c represented by formula (III) [where $R^6$, $R^7$, and $R^8$ are each hydrogen]). The polymerization conversion rate was calculated to be 99% from the solid content concentration.

N-methylpyrrolidone (NMP) was added in an amount of 350 parts relative to 100 parts (solid content: 24.75 parts) of the aqueous dispersion. Thereafter, 40.62 parts of NMP was evaporated in accompaniment to water under reduced pressure to yield a binder composition for secondary battery positive electrode-use (solid content concentration: 8%).

The content of each constitutional unit in the copolymer contained in the resultant binder composition was as shown in Table 1.

TABLE 1

| | | | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|---|
| Positive electrode binder composition | Copolymer | Constitutional unit a[*5] | Monomer type | CM-1 | CM-1 | CM-1 | CM-1 | CM-2 | CM-2 | CM-2 | CM-2 | CM-3 | CM-3 | CM-3 |
| | | | Content (mass %) | 30 | 10 | 60 | 10 | 30 | 10 | 60 | 10 | 30 | 10 | 60 |
| | | Constitutional unit b[*6] | Monomer type | AN[*1] | AN[*1] | AN[*1] | AN[*1] | AN[*1] | AN[*1] | AN[*1] | AN[*1] | AN[*1] | AN[*1] | AN[*1] |
| | | | Content (mass %) | 50 | 70 | 20 | 50 | 50 | 70 | 20 | 50 | 50 | 70 | 20 |
| | | Constitutional unit c[*7] | Monomer type | Aam[*2] | Aam[*2] | Aam[*2] | Aam[*2] | Aam[*2] | Aam[*2] | Aam[*2] | Aam[*2] | Aam[*2] | Aam[*2] | Aam[*2] |
| | | | Content (mass %) | 20 | 20 | 20 | 20 | 20 | 20 | 20 | 20 | 20 | 20 | 20 |
| | | Constitutional unit d | Monomer type | — | — | — | BA[*3] | — | — | — | BA[*3] | — | — | — |
| | | | Content (mass %) | 0 | 0 | 0 | 20 | 0 | 0 | 0 | 20 | 0 | 0 | 0 |
| | Negative electrode binder composition | | | BM-400B | BM-400B | BM-400B | BM-400B | BM-400B | BM-400B | BM-400B | BM-400B | BM-400B | BM-400B | BM-400B |
| Positive electrode slurry composition | Positive electrode binder composition | | Solid content equivalent content (parts by mass) | 1.0 | 1.0 | 1.0 | 1.0 | 1.0 | 1.0 | 1.0 | 1.0 | 1.0 | 1.0 | 1.0 |
| | Other polymer | | Type | — | — | — | — | — | — | — | — | — | — | — |
| | | | Content (parts by mass) | 0 | 0 | 0 | 0 | 0 | 0 | 0 | 0 | 0 | 0 | 0 |
| | Positive electrode active material (LiCoO$_2$) | | Content (parts by mass) | 100 | 100 | 100 | 100 | 100 | 100 | 100 | 100 | 100 | 100 | 100 |
| | Conductive material (acetylene black) | | Content (parts by mass) | 2.1 | 2.1 | 2.1 | 2.1 | 2.1 | 2.1 | 2.1 | 2.1 | 2.1 | 2.1 | 2.1 |
| Negative electrode slurry composition | Negative electrode binder composition | | Solid content equivalent content (parts by mass) | 1.0 | 1.0 | 1.0 | 1.0 | 1.0 | 1.0 | 1.0 | 1.0 | 1.0 | 1.0 | 1.0 |
| | Thickener (CMC sodium salt) | | Solid content equivalent content (parts by mass) | 1.0 | 1.0 | 1.0 | 1.0 | 1.0 | 1.0 | 1.0 | 1.0 | 1.0 | 1.0 | 1.0 |
| | Negative electrode active material (graphite) | | Content (parts by mass) | 100 | 100 | 100 | 100 | 100 | 100 | 100 | 100 | 100 | 100 | 100 |
| Evaluation | Positive electrode slurry composition viscosity stability | | | A | B | B | B | B | B | A | B | A | B | A |
| | Negative electrode slurry composition viscosity stability[*9] | | | A | A | B | A | A | A | B | A | A | A | B |
| | Positive electrode peel strength | | | A | B | A | B | A | B | B | B | A | B | A |
| | Negative electrode peel strength[*9] | | | A | A | B | A | A | A | A | A | A | A | A |
| | Secondary battery low-temperature characteristics | | | A | B | A | B | A | B | A | B | A | B | A |
| | Secondary battery high-temperature storage characteristics | | | A | A | B | A | A | A | B | A | A | A | B |
| | Secondary battery high-temperature cycle characteristics | | | A | A | B | A | A | A | A | A | A | A | A |

| | | | Example 12 | Example 13 | Example 14 | Example 15 | Example 16 | Comparative Example 1 | Comparative Example 2 | Comparative Example 3 | Comparative Example 4 |
|---|---|---|---|---|---|---|---|---|---|---|---|
| Positive electrode binder composition | Copolymer | Constitutional unit a[*5] | Monomer type | CM-3 | CM-1 | CM-1 | CM-4 | CM-1 | CM-1 | CM-1 | CM-1 | CM-5 |
| | | | Content (mass %) | 10 | 30 | 30 | 30 | 30 | 0 | 90 | 30 | 30 |
| | | Constitutional unit b[*6] | Monomer type | AN[*1] | AN[*1] | AN[*1] | AN[*1] | AN[*1] | AN[*1] | AN[*1] | — | AN[*1] |
| | | | Content (mass %) | 50 | 50 | 50 | 50 | 50 | 80 | 5 | 0 | 50 |
| | | Constitutional unit c[*7] | Monomer type | Aam[*2] | Aam[*2] | Aam[*2] | Aam[*2] | Aam[*2] | Aam[*2] | Aam[*2] | Aam[*2] | Aam[*2] |
| | | | Content (mass %) | 20 | 20 | 20 | 20 | 20 | 20 | 5 | 20 | 20 |

TABLE 1-continued

| | | | | | | | | | | |
|---|---|---|---|---|---|---|---|---|---|---|
| Positive electrode slurry composition | Negative electrode binder composition | Constitutional unit d | Monomer type | BA*3 | — | — | — | — | — | — | BA*3 | — |
| | | | Content (mass %) | 20 | 0 | 0 | 0 | 0 | 0 | 0 | 50 | 0 |
| | Positive electrode binder composition | Solid content equivalent content (parts by mass) | | BM-400B 1.0 | BM-400B 0.5 | BM-400B 1.0 | BM-400B 1.0 | (*8) 1.0 | BM-400B 1.0 | BM-400B 1.0 | BM-400B 1.0 | BM-400B 1.0 |
| | Other polymer | Type | | — | PVDF*4 | — | — | — | — | — | — | — |
| | | Content (parts by mass) | | 0 | 0.5 | 0 | 0 | 0 | 0 | 0 | 0 | 0 |
| | Positive electrode active material (LiCoO$_2$) | Content (parts by mass) | | 100 | 100 | 100 | 100 | 100 | 100 | 100 | 100 | 100 |
| | Conductive material (acetylene black) | Content (parts by mass) | | 2.1 | 2.1 | 2.1 | 2.1 | 2.1 | 2.1 | 2.1 | 2.1 | 2.1 |
| Negative electrode slurry composition | Negative electrode binder composition | Solid content equivalent content (parts by mass) | | 1.0 | 1.0 | 1.0 | 1.0 | 1.0 | 1.0 | 1.0 | 1.0 | 1.0 |
| | Thickener (CMC sodium salt) | Solid content (parts by mass) | | 1.0 | 1.0 | 1.0 | 1.0 | 1.0 | 1.0 | 1.0 | 1.0 | 1.0 |
| | Negative electrode active material (graphite) | Content (parts by mass) | | 100 | 100 | 100 | 100 | 100 | 100 | 100 | 100 | 100 |
| Evaluation | Positive electrode slurry composition viscosity stability | | | B | A | C | A | B | D | B | A | A |
| | Negative electrode slurry composition viscosity stability*9 | | | — | — | — | — | A | — | — | — | — |
| | Positive electrode peel strength | | | A | A | A | A | B | A | A | A | A |
| | Negative electrode peel strength*9 | | | — | — | — | — | A | — | — | — | — |
| | Secondary battery low-temperature characteristics | | | B | A | A | A | B | B | D | B | C |
| | Secondary battery high-temperature storage characteristics | | | A | A | A | A | A | B | C | D | D |
| | Secondary battery high-temperature cycle characteristics | | | A | A | A | A | B | C | D | D | D |

*¹AN: Acrylonitrile
*²Aam: Acrylamide
*³BA: Butyl acrylate
*⁴PVDF: Polyvinylidene fluoride
*⁵When CM-1 is used, in formula (I), $R^1$-$R^4$ are methyl groups, X is an ethylene group, and $A^-$ is a monomethyl sulfate anion When CM-2 is used, in formula (I), $R^1$-$R^4$ are methyl groups, X is an ethylene group, and $A^-$ is a bis(trifluoromethanesulfonyl)imide anion When CM-3 is used, in formula (I), $R^1$-$R^4$ are methyl groups, X is an ethylene group, and $A^-$ is a trifluoromethanesulfonate anion When CM-4 is used, in formula (I), $R^1$-$R^3$ are methyl groups, $R^4$ is an ethyl group, X is an ethylene group, and $A^-$ is a monoethyl sulfate anion When CM-5 is used, in formula (I), $R^1$-$R^4$ are methyl groups, X is an ethylene group, and $A^-$ is a chloride anion
*⁶When acrylonitrile is used, in formula (II), $R^5$ is hydrogen
*⁷When acrylamide is used, in formula (III), $R^6$-$R^8$ are hydrogen
*⁸Same binder composition as for positive electrode used as negative electrode binder composition
*⁹Only evaluated in Example 16

The results in Table 1 demonstrate that in each of Examples 1-15 in which the binder composition for secondary battery positive electrode-use contained a copolymer including specific percentages of the constitutional unit a represented by formula (I) shown above and the constitutional unit b represented by formula (II) shown above, peel strength of the positive electrode and low-temperature characteristics and high-temperature cycle characteristics of the secondary battery were excellent, and high-temperature storage characteristics of the secondary battery were also excellent. The results in Table 1 also demonstrate that in Example 16 in which the binder composition for secondary battery positive electrode-use and the binder composition for secondary battery negative electrode-use each contained a copolymer such as described above, peel strength of the positive electrode, peel strength of the negative electrode, and low-temperature characteristics and high-temperature cycle characteristics of the secondary battery were excellent, and high-temperature storage characteristics of the secondary battery were also excellent.

In particular, Examples 1-12 in Table 1 demonstrate that the various characteristics can be further improved through adjustment of the content of the constitutional unit a represented by formula (I) shown above and the content of the constitutional unit b represented by formula (II) shown above.

Furthermore, Examples 1, 2, and 14 in Table 1 demonstrate that dispersibility and stability of the slurry composition can be further improved through the binder composition for secondary battery positive electrode-use including a specific amount of the constitutional unit c represented by formula (III) described above.

On the other hand, Comparative Example 1 in Table 1 demonstrates that, as a result of the copolymer contained in the binder composition for secondary battery positive electrode-use not including the constitutional unit a represented by formula (I) shown above, the slurry composition for secondary battery positive electrode-use prepared using the aforementioned binder composition had reduced dispersibility and noticeably poorer viscosity stability, and as a consequence of this reduced dispersibility, low-temperature characteristics and high-temperature cycle characteristics were poorer.

Moreover, Comparative Example 2 in Table 1 demonstrates that, as a result of the copolymer contained in the binder composition for secondary battery positive electrode-use including an excessive amount of the constitutional unit a represented by formula (I) shown above, it was not possible to maintain binding capacity between the positive electrode mixed material layer and the current collector, and as a consequence, high-temperature storage characteristics and high-temperature cycle characteristics were noticeably poorer.

Furthermore, Comparative Example 3 in Table 1 demonstrates that, as a result of the copolymer contained in the binder composition for secondary battery positive electrode-use not including the constitutional unit b represented by formula (II) shown above, binding capacity between the positive electrode mixed material layer and the current collector was poorer, and as a consequence, high-temperature storage characteristics and high-temperature cycle characteristics were noticeably poorer.

Also, Comparative Example 4 in Table 1 demonstrates that, as a result of the copolymer contained in the binder composition for secondary battery positive electrode-use including a chloride ion as an anion, low-temperature characteristics, high-temperature storage characteristics, and high-temperature cycle characteristics were noticeably poorer.

Examples 1 and 13 in Table 1 demonstrate that the various characteristics can be favorably maintained even when, in addition to the binder composition containing the copolymer that includes the specific percentages of the constitutional unit a represented by formula (I) shown above and the constitutional unit b represented by formula (II) shown above, a polymer other than the copolymer, such as a fluorine-containing polymer, is contained in preparation of the slurry composition for secondary battery positive electrode-use.

It should be noted that although it was confirmed in the examples described above that the expected effects are obtained when a secondary battery is prepared using the presently disclosed electrode for secondary battery-use as a positive electrode and using the presently disclosed electrode for secondary battery-use or a known negative electrode other than the presently disclosed electrode for secondary battery-use as a negative electrode, these expected effects are also obtained in a situation in which a secondary battery is prepared using the presently disclosed electrode for secondary battery-use as a negative electrode and a known positive electrode other than the presently disclosed electrode for secondary battery-use as a positive electrode.

INDUSTRIAL APPLICABILITY

According to the present disclosure, it is possible to provide a binder composition for secondary battery electrode-use that has high binding capacity, and that is capable of suppressing corrosion of a current collector and an increase in internal resistance when used in production of a secondary battery.

Moreover, according to the present disclosure, it is possible to provide a slurry composition for secondary battery electrode-use that enables production of an electrode for secondary battery-use that has high peel strength and low internal resistance, and that enables a secondary battery to exhibit good cycle characteristics.

Furthermore, according to the present disclosure, it is possible to provide an electrode for secondary battery-use that has high peel strength and low internal resistance, and that enables a secondary battery to exhibit good cycle characteristics.

Also, according to the present disclosure, it is possible to provide a secondary battery that has excellent cycle characteristics and low internal resistance.

The invention claimed is:

1. A binder composition for secondary battery electrode-use comprising:

a copolymer; and a dispersion medium, wherein the copolymer includes at least 5 mass % and no greater than 80 mass % of a constitutional unit represented by formula (I) shown below

[CHEM. 1]

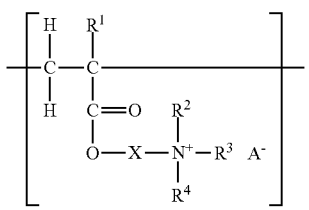
(I)

where, in formula (I), $R^1$ represents hydrogen or a monovalent organic group, $R^2$, $R^3$, and $R^4$ each represent, independently of one another, hydrogen or a monovalent organic group, X represents a hydrocarbon chain, and $A^-$ represents a monovalent anion selected from the group consisting of a bis(trifluoromethanesulfonyl)imide anion, a bis(fluorosulfonyl)imide anion, a perfluoroalkanesulfonate anion, and a monoalkyl sulfate anion, the copolymer includes at least 5 mass % and no greater than 90 mass % of a constitutional unit represented by formula (II) shown below

[CHEM. 2]

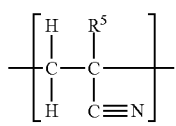
(II)

where, in formula (II), $R^5$ represents hydrogen, a methyl group, or a halogen atom, and the copolymer includes no greater than 20 mass % of a constitutional unit represented by formula (III) shown below

[CHEM. 3]

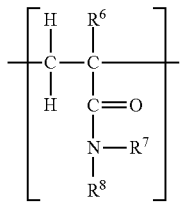
(III)

where, in formula (III), $R^6$ represents hydrogen or a substituted or unsubstituted alkyl group, and $R^7$ and $R^8$ each represent, independently of one another, hydrogen or a group selected from the group consisting of a substituted or unsubstituted alkyl group, a substituted or unsubstituted alkenyl group, a substituted or unsubstituted alkynyl group, and a substituted or unsubstituted aryl group.

2. The binder composition for secondary battery electrode-use of claim 1, wherein $R^1$ is a methyl group, $R^2$, $R^3$, and $R^4$ are each a methyl group or an ethyl group, X is an ethylene group, and $A^-$ is a monovalent anion selected from the group consisting of a bis(trifluoromethanesulfonyl)imide anion, a trifluoromethanesulfonate anion, and a monomethyl sulfate anion.

3. A slurry composition for secondary battery electrode-use comprising:

the binder composition for secondary battery electrode-use of claim 1; and an electrode active material.

4. The slurry composition for secondary battery electrode-use of claim 3, further comprising a polymer other than the copolymer.

5. The slurry composition for secondary battery electrode-use of claim 4, wherein the polymer other than the copolymer is a fluorine-containing polymer.

6. An electrode for secondary battery-use obtainable by applying the slurry composition for secondary battery electrode-use of claim 3 onto a current collector and drying the slurry composition for secondary battery electrode-use that has been applied onto the current collector.

7. A secondary battery comprising:

a positive electrode;

a negative electrode;

an electrolysis solution; and a separator, wherein either or both of the positive electrode and the negative electrode are the electrode for secondary battery-use of claim 6.

* * * * *